(12) United States Patent
Liu et al.

(10) Patent No.: US 10,652,854 B2
(45) Date of Patent: May 12, 2020

(54) PAGING SUPER FRAME WINDOW FOR NARROWBAND COMMUNICATIONS USING THE UNLICENSED SPECTRUM

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 16/167,417

(22) Filed: Oct. 22, 2018

(65) Prior Publication Data

US 2019/0132817 A1   May 2, 2019

Related U.S. Application Data

(60) Provisional application No. 62/579,080, filed on Oct. 30, 2017.

(51) Int. Cl.
  *H04W 68/02*   (2009.01)
  *H04W 76/28*   (2018.01)
  (Continued)

(52) U.S. Cl.
  CPC ............ *H04W 68/02* (2013.01); *H04B 1/713* (2013.01); *H04L 5/00* (2013.01); *H04L 5/005* (2013.01);
  (Continued)

(58) Field of Classification Search
  CPC ......... H04B 1/713; H04L 5/00; H04L 5/0044; H04L 5/005; H04W 16/14; H04W 48/12;
  (Continued)

(56) References Cited

U.S. PATENT DOCUMENTS

2015/0237577 A1   8/2015   Zhang et al.
2017/0230933 A1   8/2017   Radulescu et al.
(Continued)

FOREIGN PATENT DOCUMENTS

WO   2017162813 A1   9/2017

OTHER PUBLICATIONS

Ratasuk Elements of Narrowband IoT in 3GPP REL-14 and REL-15, IEEE Xplore (Year: 2017).*
(Continued)

*Primary Examiner* — Robert J Lopata
(74) *Attorney, Agent, or Firm* — Nerrie M. Zohn

(57) ABSTRACT

A DRX/eDRX cycle may include a single PFW located in one of the non-anchor hopping frames and used to transmit a paging message. When the LBT procedure fails for the non-anchor hopping frame in which the PFW is located, transmission of the paging message may be delayed. Postponing the transmission of the paging message until a subsequent DRX/eDRX cycle be detrimental since the UE may not receive the change in system information at the next modification boundary. Thus, there is a need for paging mechanism the increases the chance of a UE receiving a paging message during a DRX/eDRX cycle. The present disclosure provides a paging mechanism that uses a PSFW with a PFW in each non-anchor hopping frame within a DRX/eDRX cycle. Hence, the chance of a UE receiving a paging message and hence the change in system information may be increased.

28 Claims, 16 Drawing Sheets

(51) Int. Cl.
  *H04W 74/08* (2009.01)
  *H04W 16/14* (2009.01)
  *H04L 5/00* (2006.01)
  *H04B 1/713* (2011.01)
  *H04W 52/02* (2009.01)
  *H04W 8/00* (2009.01)
  *H04W 48/16* (2009.01)
  *H04W 48/12* (2009.01)

(52) U.S. Cl.
  CPC ....... *H04W 16/14* (2013.01); *H04W 52/0216* (2013.01); *H04W 74/085* (2013.01); *H04W 76/28* (2018.02); *H04W 8/005* (2013.01); *H04W 48/12* (2013.01); *H04W 48/16* (2013.01); *H04W 74/0808* (2013.01)

(58) Field of Classification Search
  CPC . H04W 48/16; H04W 52/0216; H04W 68/02; H04W 74/0808; H04W 74/085; H04W 76/28; H04W 8/005
  USPC .......................................................... 370/329
  See application file for complete search history.

(56) References Cited

U.S. PATENT DOCUMENTS

| | | | | |
|---|---|---|---|---|
| 2018/0098334 | A1* | 4/2018 | Tie | H04W 28/0205 |
| 2018/0160407 | A1* | 6/2018 | Wang | H04W 48/08 |
| 2018/0249511 | A1* | 8/2018 | Rathonyi | H04W 4/70 |
| 2019/0208503 | A1* | 7/2019 | Li | H04W 72/005 |
| 2019/0239051 | A1* | 8/2019 | Hwang | H04W 4/80 |
| 2019/0357175 | A1* | 11/2019 | Hoglund | H04W 76/27 |
| 2020/0015280 | A1* | 1/2020 | Fujishiro | H04W 76/27 |
| 2020/0029392 | A1* | 1/2020 | Ye | H04W 16/14 |

OTHER PUBLICATIONS

Ericsson., "Frequency Hopping Configuration for Paging", 3GPP Draft, 36331 CR2329 (REL-13) R2-165614, 3rd Generation Partnership Project (3GPP), Mobile Competence Centre, 650, Route Des Lucioles, F-06921 Sophia-Antipolis Cedex, France vol. RAN WG2, no. Gothenburg, Sweden, 20160822-20160826 Sep. 26, 2016 (Sep. 26, 2016), XP051161327, 7 Pages, Retrieved from the Internet: URL:http://www.3gpp.orgjftpjtsg_ran/WG2_RL2/Specifications/201609_draft_specs_after_RAN_73/History/ [retrieved on Sep. 26, 2016].

International Search Report and Written Opinion—PCT/US2018/057077—ISA/EPO—dated Feb. 12, 2019.

LG Electronics., "Non-anchor PRB Enhancements for eNB-IoT", 3GPP Draft, R1-1611765, 3rd Generation Partnership Project (3GPP), Mobile Competence Centre, 650, Route Des Lucioles, F-06921 Sophiaantipolis Cedex, France vol. RAN WG1, no. Reno, USA, 20161114-20161118 Nov. 13, 2016 (Nov. 13, 2016), XP051175734, 11 Pages, Retrieved from the Internet: URL:http://ww.3gpp.org/ftp/Meetings_3GPP_SYNC/RAN1/Docs/[retrieved on Nov. 13, 2016].

* cited by examiner

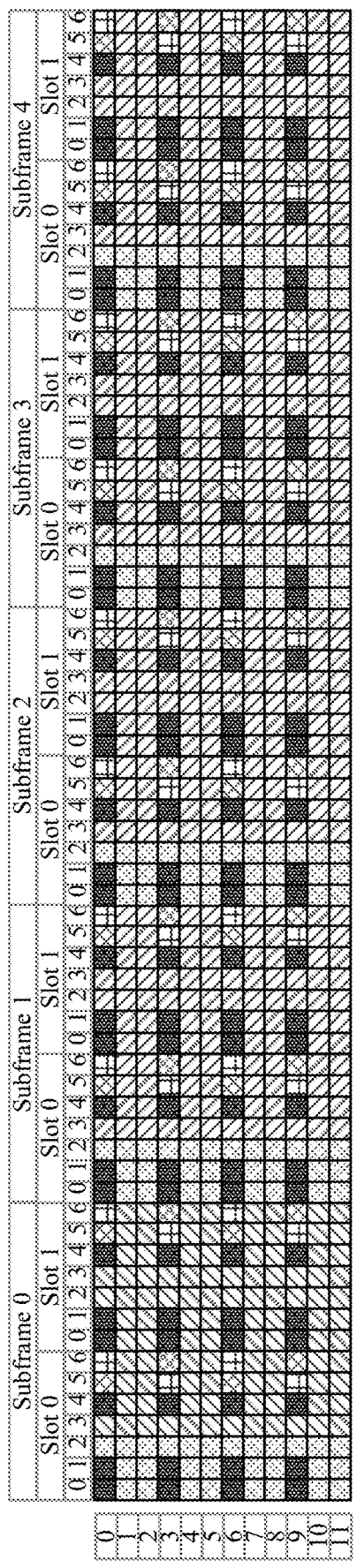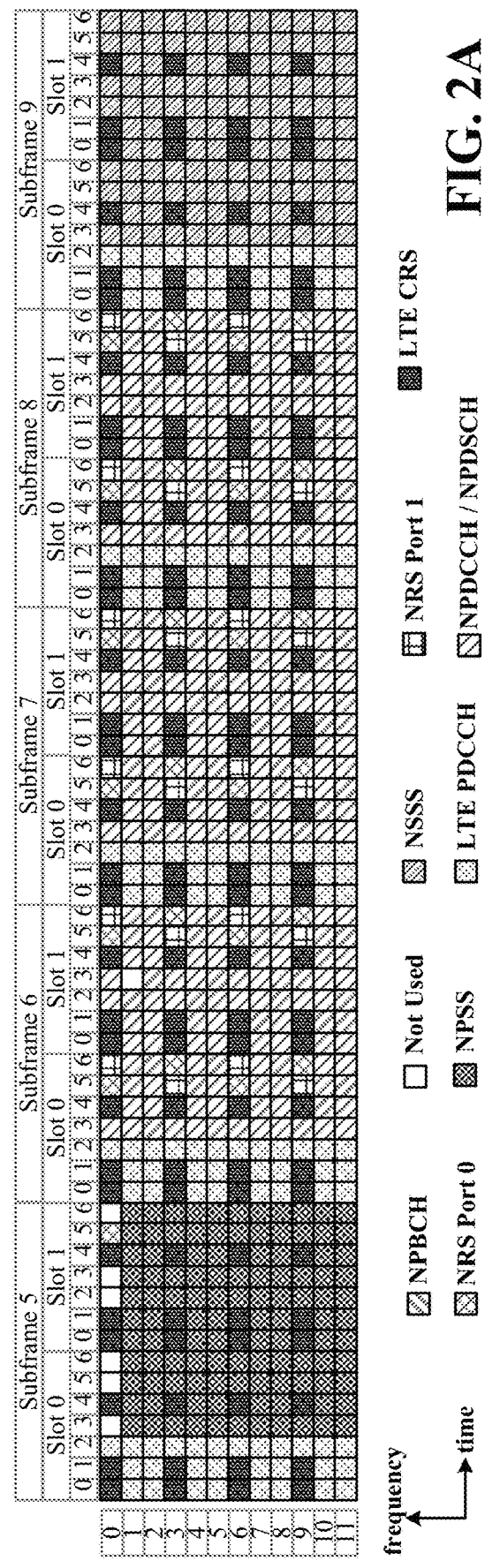
FIG. 2A

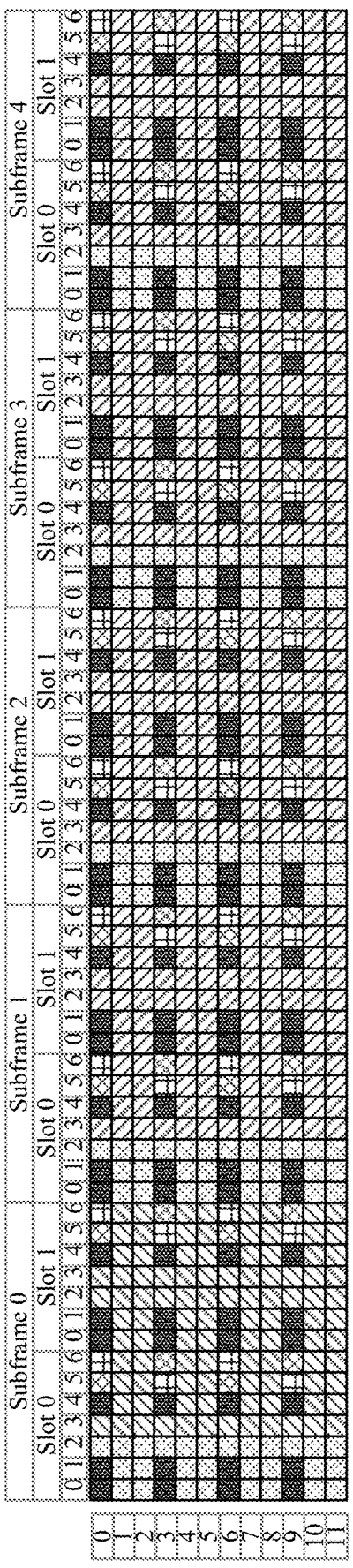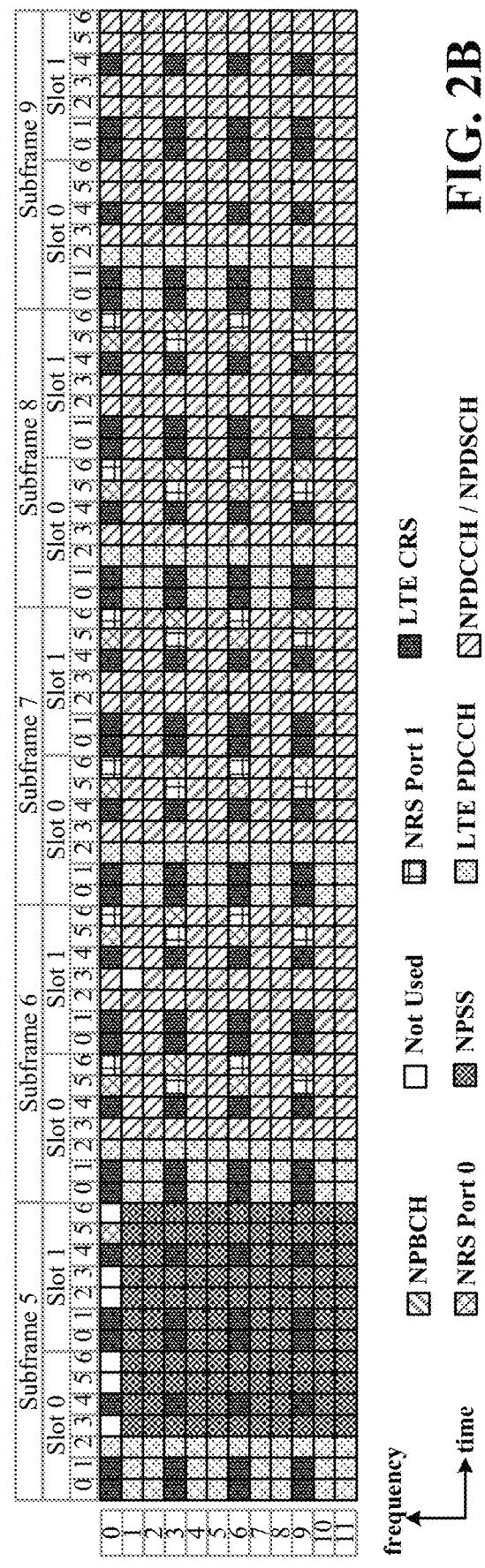
FIG. 2B

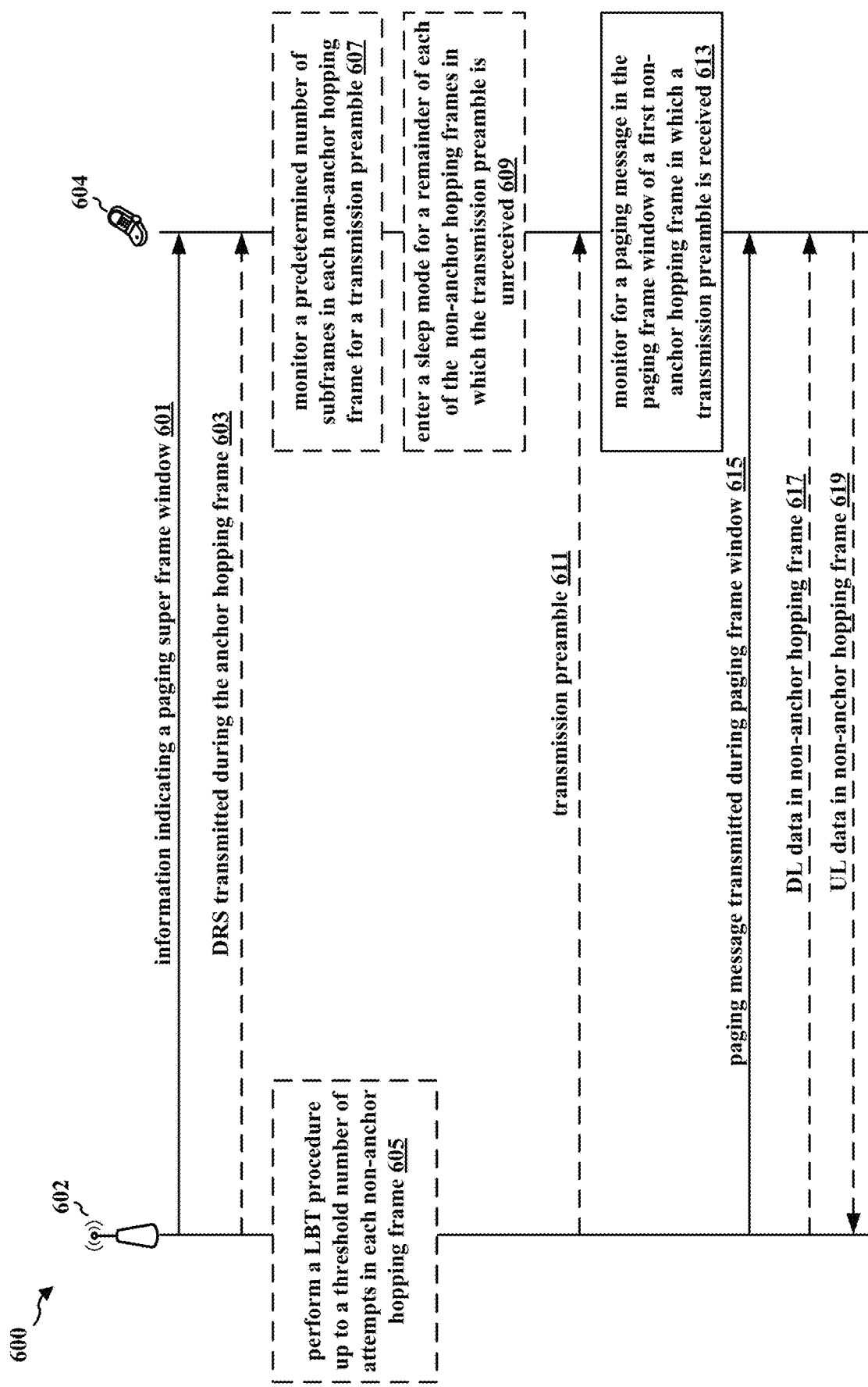

PAGING SUPER FRAME WINDOW FOR NARROWBAND COMMUNICATIONS USING THE UNLICENSED SPECTRUM

CROSS-REFERENCE TO RELATED APPLICATION(S)

This application claims the benefit of U.S. Provisional Application Ser. No. 62/579,080, entitled "PAGING SUPER FRAME WINDOW FOR NARROWBAND COMMUNICATIONS USING THE UNLICENSED SPECTRUM" and filed on Oct. 30, 2017, which is expressly incorporated by reference herein in its entirety.

BACKGROUND

Technical Field

The present disclosure relates generally to communication systems, and more particularly, to narrowband communications using the unlicensed spectrum.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard.

In certain implementations, 5GNR may use narrowband communications that involve communicating with a limited frequency bandwidth as compared to the frequency bandwidth used for LTE communications. One example of narrowband communication is narrowband (NB) IoT (NB-IoT) communication, which may be limited to a single resource block (RB) of system bandwidth, e.g., 180 kHz. Another example of narrowband communication is enhanced machine-type communication (eMTC), which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings. There exists a need for further improvements in narrowband communications. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrowband communications involve communicating with a limited frequency bandwidth as compared to the frequency bandwidth used for LTE communications. One example of narrowband communication is narrowband NB-IoT communication, which may be limited to a single RB of system bandwidth, e.g., 180 kHz. Another example of narrowband communication is eMTC, which may be limited to six RBs of system bandwidth, e.g., 1.08 MHz. NB-IoT communication and/or eMTC may reduce device complexity, enable multi-year battery life, and provide deeper coverage to reach challenging locations such as deep inside buildings.

When the unlicensed spectrum is used for narrowband communications, non-anchor hopping frames located on different non-anchor hopping frequencies may be used for communications between a base station and UE. The base station may perform at least one listen-before-talk (LBT) procedure at the start of each non-anchor hopping frame before communicating with the UE. The LBT procedure may be used to determine if the narrowband frequency associated with that non-anchor hopping frame is currently being used by other devices (e.g., devices using a different RAT such as Wi-Fi). When the LBT procedure fails, the base station may determine that the narrowband frequency is occupied, and hence, unavailable for communications with the UE. Otherwise, when the LBT procedure succeeds, the base station may determine that the narrowband frequency is not occupied, and hence, is available for communications with the UE.

A discontinuous reception (DRX) cycle may include a single paging frame window (PFW) located in one of the non-anchor hopping frames. An extended DRX (eDRX) cycle may include a plurality of non-anchor hopping frames, and a single paging time window (PTW) located in one of the non-anchor hopping frames. When the LBT procedure fails for the non-anchor hopping frame in which the PFW or PTW is located, transmission of the paging message may be delayed until the PFW or PTW in the subsequent DRX cycle or eDRX cycle, respectively. Postponing the transmission of the paging message until a subsequent DRX cycle and/or eDRX cycle may be detrimental since the UE may not receive the change in system information at the next modification boundary, and hence, may not monitor for and/or receive the paging message in the subsequent DRX cycle and/or eDRX cycle.

The present disclosure provides a solution that increases the chance of a UE receiving a paging message during a DRX cycle and/or an eDRX cycle by providing a paging mechanism that uses a paging super frame window (PSFW) (e.g., multiple hopping periods each spanning multiple radio frames) with a PFW in each non-anchor hopping frame within a DRX cycle and/or an eDRX cycle. Hence, even when each of the available LBT attempts on one of the non-anchor hopping frames fails, each of the subsequent non-anchor hopping frames includes an opportunity to send the paging message to the UE. Using the techniques described below in connection with FIGS. 2A-12, the chance of a UE receiving a paging message and hence the change in system information may be increased. In the present disclosure, the terms super frame and hyper frame may be used interchangeably. Additionally and/or alternatively, the terms PSFW and paging hyper frame window (PHFW) may be used interchangeably.

In an aspect of the disclosure, a method, a computer-readable medium, and an apparatus are provided. In certain configurations, the apparatus may be a base station. In certain aspects, the apparatus may transmit information indicating a paging super frame window to at least one UE. In certain aspects, the paging super frame window may include a plurality of non-anchor hopping frames, each of the plurality of non-anchor hopping frames being located on a different non-anchor channel. In certain other aspects, each of the plurality of non-anchor hopping frames may include a paging frame window. In certain other aspects, the apparatus may perform an LBT procedure up to a threshold number of attempts at a frame boundary of each of the plurality non-anchor hopping frames in the paging super frame window. In certain aspects, the LBT procedure may be performed until one of the attempts succeeds. In certain other aspects, the apparatus may transmit a paging message in the paging frame window of at least one first non-anchor hopping frame in the paging super frame window in which the LBT procedure succeeds.

In certain configurations, the apparatus may be a UE. In certain aspects, the apparatus may receive information indicating a paging super frame window from a base station. In certain other aspects, the paging super frame window may include a plurality of non-anchor hopping frames. In certain other aspects, each of the plurality of non-anchor hopping frames may be located on a different non-anchor channel. In certain other aspects, each of the plurality of non-anchor hopping frames may include a paging frame window. In certain other aspects, the apparatus may monitor for a paging message in the paging frame window of at least one first non-anchor hopping frame in which a transmission preamble is received from the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of an NB frame structure for in-band deployment inside an LTE carrier (even radio frame), an NB frame structure for in-band deployment inside an LTE carrier (odd radio frame), an NB frame structure for guard band/stand-alone deployment inside an LTE carrier (even radio frame), and an NB frame structure for guard band/standalone deployment inside an LTE carrier (even radio frame), respectively.

FIG. 6 illustrates a data flow between a base station and a UE that may be used to increase the chance of a paging message transmission during a DRX/eDRX cycle in accordance with certain aspects of the disclosure.

DETAILED DESCRIPTION

Figure 1:
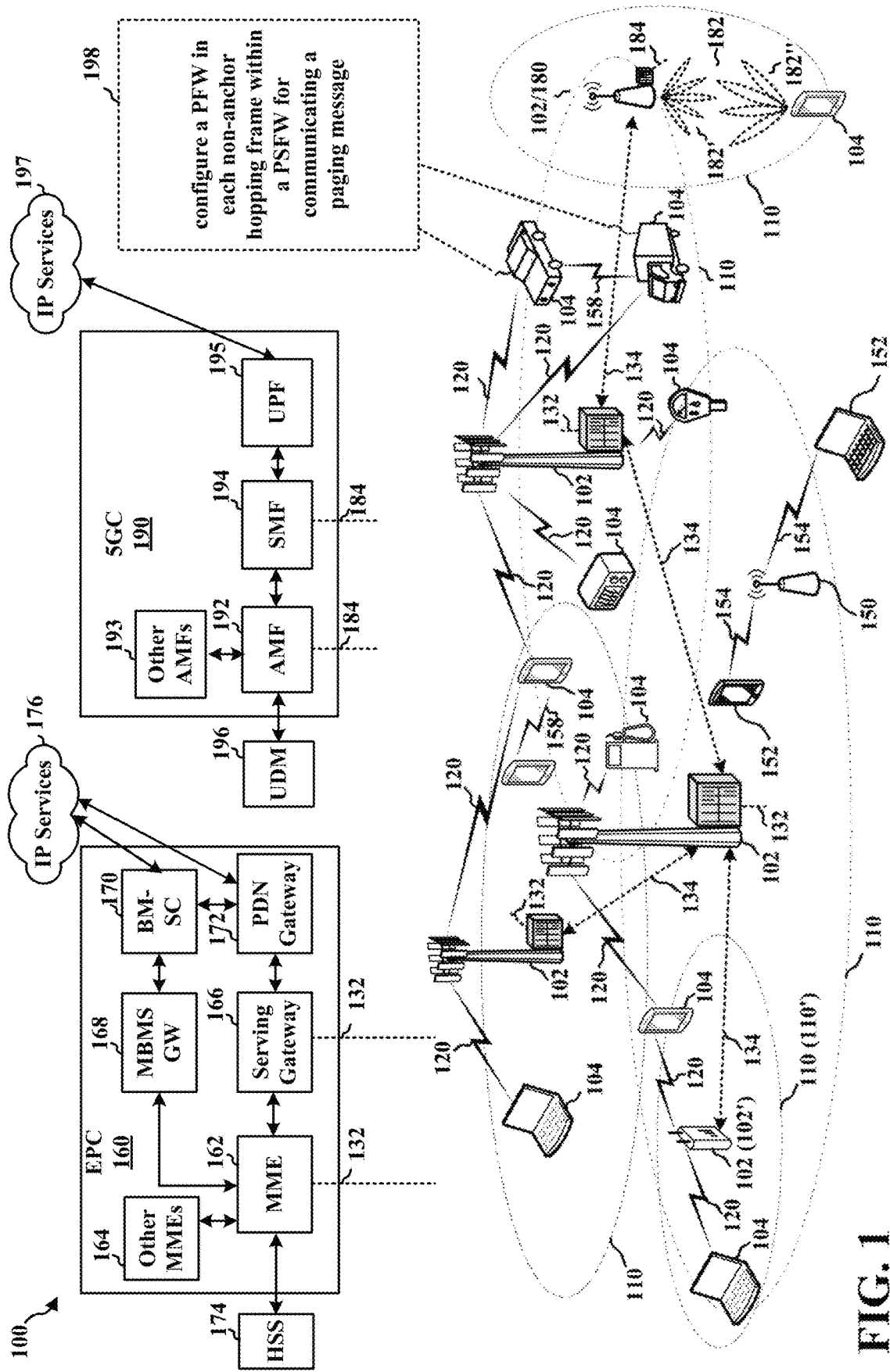
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters.

The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to configure a PFW in each non-anchor hopping frame within a PSFW for communicating a paging message (198) to the UE 104, e.g., as described below in connection with any of FIGS. 2A-12.

Figure 2C:
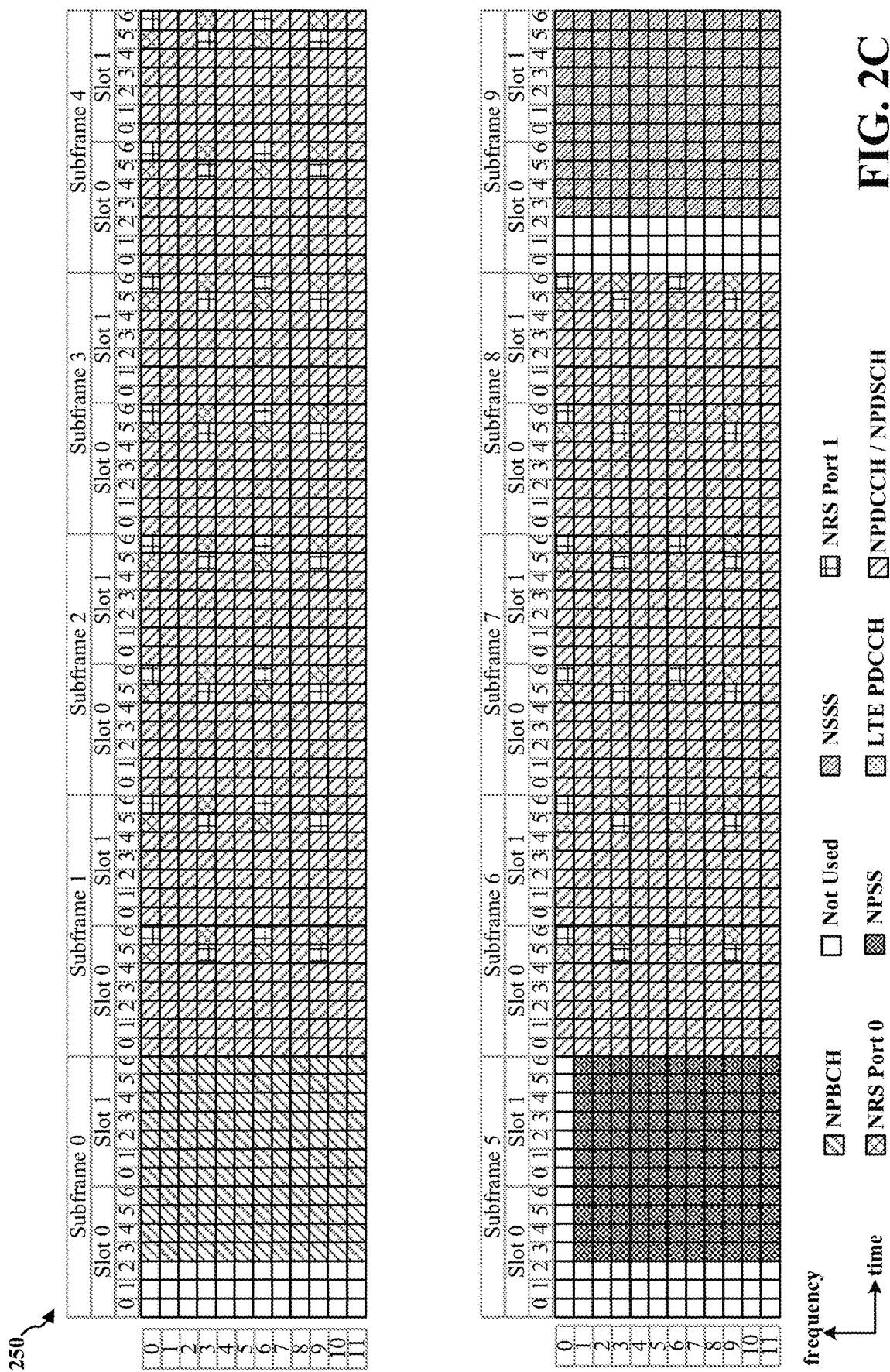
Figure 2D:
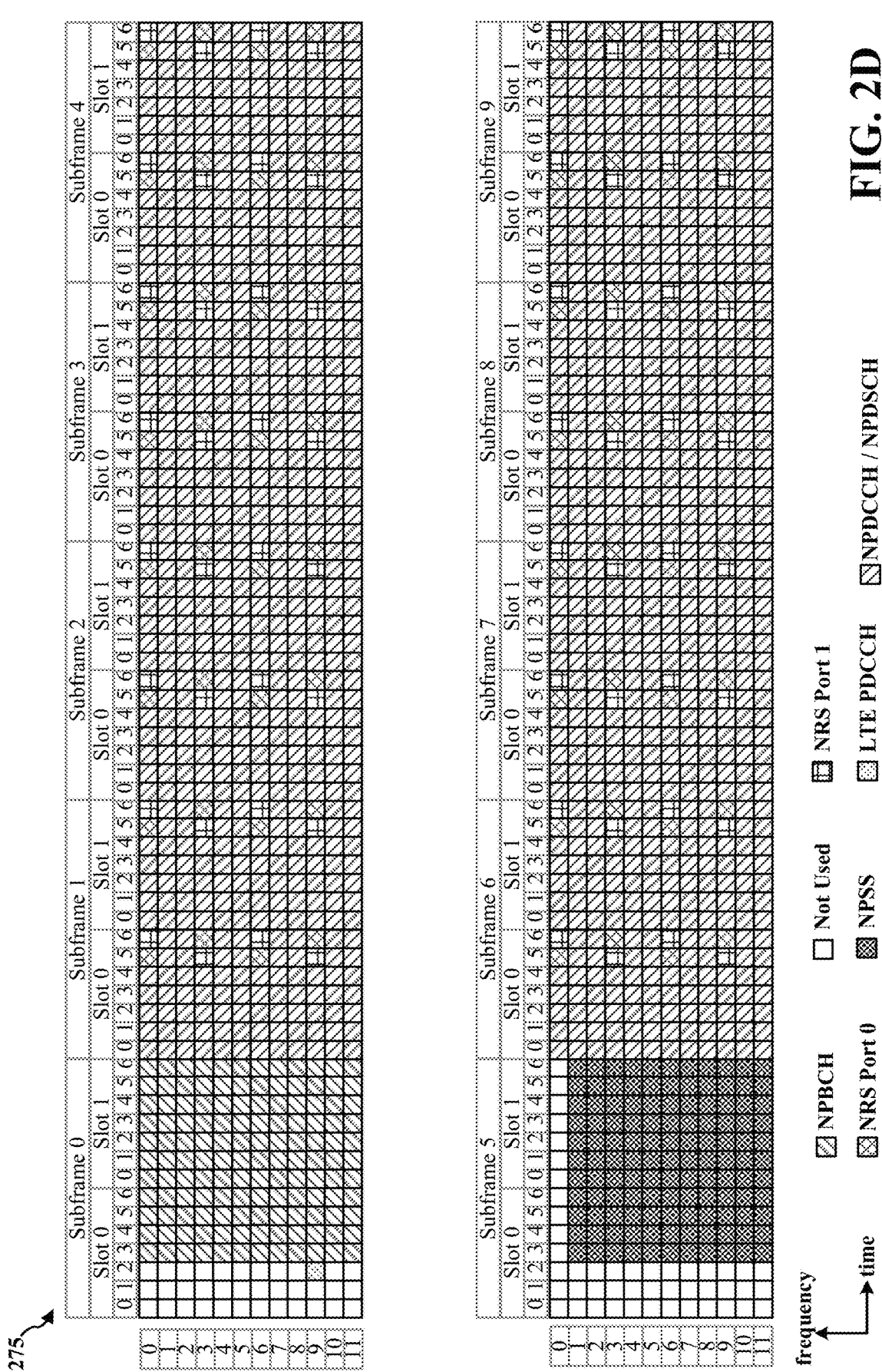

FIG. 2A is a diagram 200 illustrating an example of an NB frame structure for in-band deployment inside an LTE carrier (even radio frame). FIG. 2B is a diagram 225 illustrating an example of an NB frame structure for in-band deployment inside an LTE carrier (odd radio frame). FIG. 2C is a diagram 250 illustrating an example of an NB frame structure for guard band/standalone deployment inside an LTE carrier (even radio frame). FIG. 2D is a diagram 275 illustrating an example of an NB frame structure for guard band/standalone deployment inside an LTE carrier (even radio frame). Other wireless communication technologies may have a different frame structure and/or different channels. A radio frame (10 ms) may be divided into 10 equally sized subframes (e.g., subframe 0-subframe 9). Each subframe may include two consecutive time slots (e.g., slot 0 and slot 1). A resource grid may be used to represent the two time slots, each time slot including one or more time concurrent RBs (also referred to as physical RBs (PRBs)) of 180 kHz. The resource grid is divided into multiple resource elements (REs). For a normal cyclic prefix, an RB may contain 12 consecutive subcarriers in the frequency domain and 7 consecutive symbols (for DL, orthogonal frequency-division multiplexing (OFDM) symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme. The in-band deployment of NB-IoT may utilize RBs within an LTE carrier. The guard band deployment of NB-IoT may utilize the unused RBs within an LTE carrier's guard-band. The stand-alone deployment of NB-IoT may utilize RBs within the global system for mobile communications (GSM) carriers.

As illustrated in FIGS. 2A-2D, some of the REs in each of the subframes carry NB reference signals (NRS) that may be used for broadcast transmission(s) or dedicated DL transmission(s), regardless of whether data is actually transmitted. Depending on the transmission scheme, NRS may be transmitted on one antenna port or on two antenna ports (e.g., antenna port 0 and antenna port 1). The values of the NRS may be similar to cell-specific reference signals (CRS) in LTE. NRS may indicate an NB cell identifier (NCellID), while LTE CRS may indicate a physical cell identifier (PCI). For the in-band deployment, the LTE CRS may also be transmitted in subframes which are not used for MBSFN, as illustrated in FIGS. 2A and 2B. Although the structure of the NRS and the LTE CRS may not overlap, the CRS may be taken into account for rate matching and RE mapping purposes. DL transmissions may not use the REs allocated for NRS and/or LTE CRS.

For initial synchronization and in order to determine the NCellID, an NB primary synchronization signal (NPSS) may be transmitted in subframe 5 of even and odd radio frames, and an NB secondary synchronization signal (NSSS) may be transmitted in subframe 9 in even radio frames. Using in-band deployment, the first three OFDM symbols in each of subframe 5 and subframe 9 may carry the LTE physical downlink control channel (PDCCH), and hence, the first three OFDM symbols in subframes 5 and 9 may not carry NPSS and NSSS, as illustrated in FIGS. 2A and 2B. NPSS and the NSSS may be punctured by LTE CRS in the in-band deployment. Using the guard band deployment and/or standalone deployment, the first three OFDM symbols in each of subframe 5 and subframe 9 may be unused, and hence, the first three OFDM symbols in subframes 5 and 9 may not carry the NPSS and NSSS, as illustrated in FIGS. 2C and 2D.

The NB physical broadcast channel (NPBCH) may carry the NB master information block (NB-MIB). After physical layer baseband processing, the resulting NB-MIB may be split into eight blocks. The first block may be transmitted in subframe 0 of each radio frame in a set of eight consecutive radio frames. The second block may be transmitted in subframe 0 of each radio frame in the subsequent set of eight consecutive radio frames. The process of NB-MIB block transmission may be continued until the entire NB-MIB is transmitted. By using subframe 0 for all NB-MIB block transmissions, collisions between the NPBCH and a potential LTE MBSFN transmission may be avoided when the in-band deployment of NB-IoT is used. As illustrated in FIGS. 2A and 2B, NPBCH symbols may be mapped around the NRS and the LTE CRS for the in-band deployment. As illustrated in FIGS. 2C and 2D, the NPBCH may occupy all of subframe 0 except for the first three symbols which are left unused for the guard band deployment and/or standalone deployment.

The principle of a control channel and a shared channel also applies to NB-IoT, defining the NB physical downlink control channel (NPDCCH) and the NB physical downlink shared channel (NPDSCH). Not all subframes may be used for the transmission of dedicated DL channels. In RRC signaling, a bitmap indicating the valid subframes for NPDCCH and/or NPDSCH may be signaled to the UE. When a subframe is not indicated as valid, an NPDCCH and/or NPDSCH may be postponed until the next valid subframe. The NPDCCH may indicate which UEs have data located in the NPDSCH, where to find the data, and how often the data is repeated. UL grants that indicate REs allocated to a UE for UL data transmission(s) may also be located in the NPDCCH. The NPDCCH may also carry paging and/or system information updates. NPDCCH symbols and NPDSCH symbols may be mapped around the NRS, and for the in-band deployment of NB-IoT, also around the LTE CRS.

Figure 3:
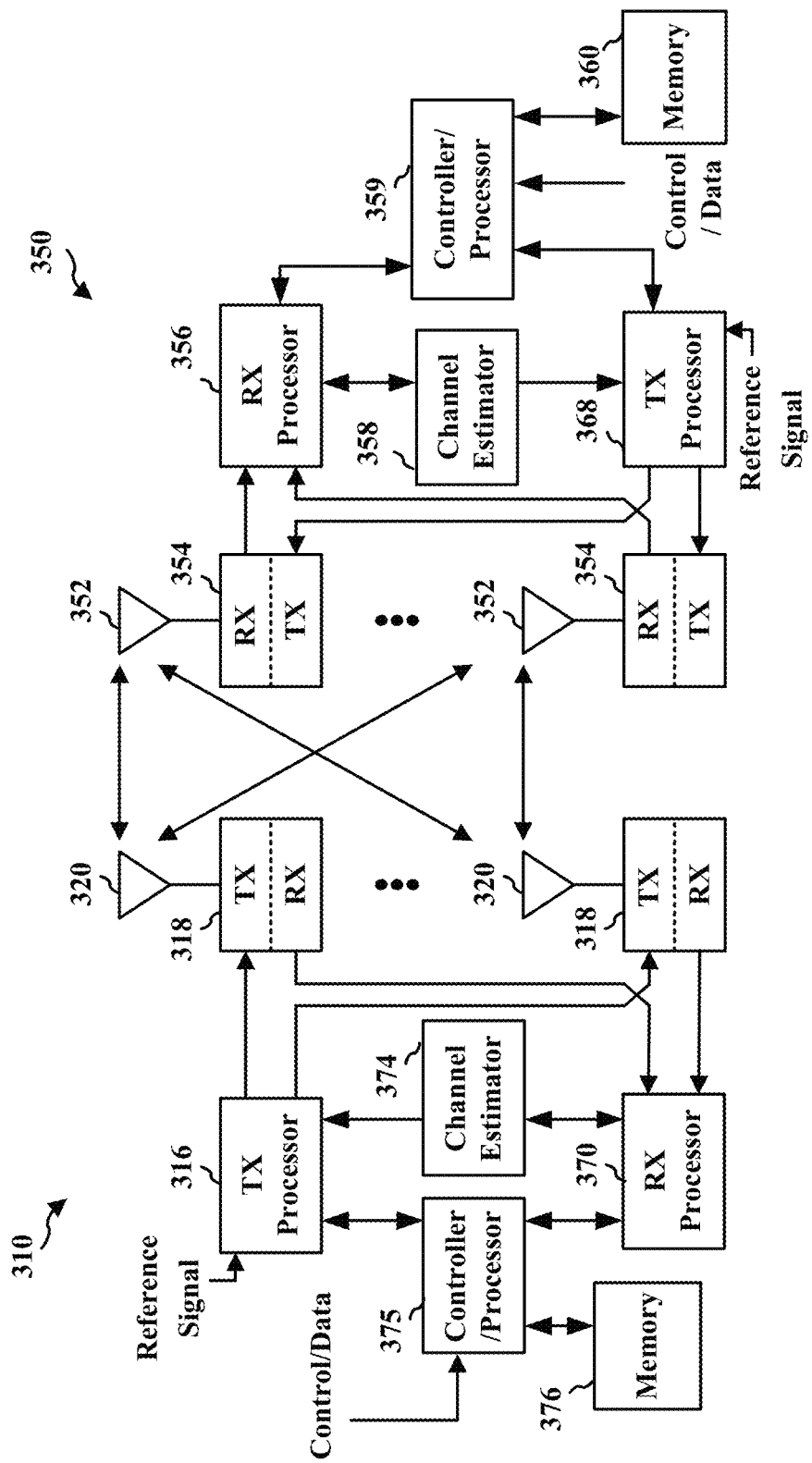
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

A base station may send a paging message to a UE in idle mode (e.g., RRC_IDLE mode) in order to trigger an RRC connection and/or to indicate a change in system information. In certain configurations, the paging message may include a list of the UEs being paged, and may indicate, for a particular UE, whether the paging message is intended for an RRC connection set up or a change in system information. In certain configurations, the system information may change at a time boundary of a modification period.

When a UE finds its identification (e.g., UE_ID) in the list, the UE may either initialize an RCC connection or read an SIB 1 narrowband (SIB1-NB) message that indicates a change in system information. The SIB1-NB message may be transmitted over the NPDSCH, have a predetermined period (e.g., a period of 256 radio frames), and may be repeated a predetermined number of times (e.g., 4 times, 8 time, 16 times, etc.). The UE may determine the radio frame on which the SIB1-NB starts by the number of repetitions (e.g., indicated in the paging message) and the NCellID associated with the base station. Using the information included in the SIB1-NB, the UE may determine which SIBs to read in order to determine the change in system information.

In order to increase battery lifetime, a UE may monitor a subset of subframes and/or radio frames for reception of the paging message rather than monitoring all subframes and/or radio frames. For example, the UE may begin monitoring for the paging message at a paging occasion (PO). The PO may refer to the subframe in which the paging message may be transmitted and/or the start of paging message repetitions addressed to a paging radio network temporary identifier (P-RNTI) by the base station. In certain configurations, the base station may scramble the CRC of the NPDCCH with the P-RNTI for transmission of an NPDSCH that carries the paging message.

In certain configurations, the PO may be located within a paging frame (PF). The PF may refer to a specific radio frame in which the PO is located, and hence, in which the paging message may be received by the UE. Hence, the UE may monitor the PO within a particular PF. The UE may determine the PO and the PF from the DRX cycle and the UE's international mobile subscriber identity (IMSI) that is provided by the UE's universal subscriber identify module (USIM) card. Information associated with the DRX cycle may be included in a SIB2-NB transmitted by the base station.

DRX may refer to the discontinuous reception of DL control channel data used to increase the battery lifetime of a UE. A DRX cycle may include, e.g., 128 radio frames, 256 radio frames, 512 radio frames, or 1024 radio frames, corresponding to a time interval between 1.28 seconds and 10.24 seconds. An eDRX cycle may refer to a DRX cycle that includes a threshold number of radio frames (e.g., 512 radio frames or more). In the present disclosure, the terms DRX and eDRX may be used interchangeably.

Because the PO and the PF may be associated with the IMSI, different UEs may have different POs, which may be distributed in the time domain. When multiple POs for multiple UEs are located within a single DRX cycle, the paging message may be repeated in each PO, and a UE may monitor a single PO within the DRX cycle for the paging message.

The UE may determine the PF using equation (1) seen below.

$$\text{SFN mod } T = (T/N)*(UE\_ID \text{ mod } N) \qquad \text{equation (1)}$$

With respect to equation (1), SFN mod T is the PF, SFN is the initial subframe of the PF, T may be the paging DRX cycle defined in radio frames (e.g., up to 256 radio frames), N may be equal to min(nB, T), nB may be 4T, 2T, T, T/2, T/4, T/8, T/16, T/32, T/64, T/128, T/256 (nB may be determined from an SIB2), UE_ID may be equal to IMSI mod 1024 (in LTE), UE_ID may be equal to IMSI mod 16384 (in eMTC). By way of example, when UE_ID=51, N=T/4, T=32, the PFs within a DRX cycle may include radio frames 12, 44, 76, etc.

In certain configurations, the UE may determine the PO using a pre-configured look-up table using equations (3) and (4) seen below.

$$Ns = \text{Max}(1, nB/T) \qquad \text{equation (3)}$$

$$i\_s = (UE\_ID/N) \text{ mod } Ns \qquad \text{equation (4)}$$

As seen above in equations (3) and (4), Ns may be the number of UEs that the base station may page within one radio frame (e.g., Ns may be equal to 1, 2, 3, or 4), nB may be 4T, 2T, T, T/2, T/4, T/8, T/16, T/32, T/64, T/128, T/256 (nB may be determined from an SIB2), T may be the paging DRX cycle defined in radio frames (e.g., up to 256 radio frames), i_s may indicate a partitioning of UEs to be paged into one radio frame into N_s groups, where i_s may be a UE group index, UE_ID is the ID of the UE, and N may be equal to min(nB, T).

When the DRX cycle includes greater than or equal to a threshold number of radio frames (e.g., 512 radio frames), the paging message may be transmitted in a paging time window (PTW) that includes a plurality of subframes and/or radio frames. The location and length of the PTW within the DRX cycle may be indicated to the UE by the base station. The location of the PO and PF within a PTW may be determined using equations (1)-(4) and the information indicating the beginning and end of the PTW may be determined using equations (1)-(4).

In certain configurations, narrowband frequency hopping may be used in order to enhance frequency diversity for transmissions involving a large number of subframes. The base station may send information associated with a frequency hopping configuration to the UE. The frequency hopping configuration may indicate which narrowband channels in a wideband channel may be used for narrowband communications. For example, the frequency hopping configuration may indicate that out of the maximum number of narrowband channels (e.g., 100 NB channels) within a wideband channel, communications between the base station and the UE may occur on a predetermined number of the narrowband channels (e.g., 15 of the 100 NB channels).

The frequency hopping configuration may include an anchor frequency on which discovery reference signals (DRS) (e.g., NPSS, NSSS, NPBCH, (SIB-NB), PSS, SSS, PBCH, and SIB bandwidth reduced (SIB-BR) etc.) may be transmitted by the base station, and which may be used by a UE for cell acquisition. Further, the frequency hopping configuration may include a plurality of non-anchor hopping frequencies that may be used to communicate DL and UL data.

The information associated with the frequency hopping configuration may also indicate the radio frames in each hopping period. For example, each hopping period may include 8 radio frames, and hence, be 80 ms in duration. A first duration of a hopping period may include an anchor hopping frame (e.g., 5 milliseconds on the anchor channel) used for communication DRS on the anchor channel. A second duration of the hopping period may include a non-anchor hopping frame (e.g., 75 ms on the non-anchor hopping channel) used for DL and UL data communication.

Based on the frequency hopping configuration, the UE may hop between the different narrowband frequency channels (e.g., anchor channel and non-anchor channel in the same hopping period) to provide coverage enhancement (e.g., to exploit the frequency diversity of the wideband channel) while monitoring, receiving, and/or transmitting signals. The UE may hop back to the anchor channel at the start of each hopping period. The non-anchor hopping channels in adjacent hopping periods may be different narrowband channels. When frequency hopping is used, the PO and/or PF may be associated with a PFW. The PFW may begin at the start of a data portion of a non-anchor hopping frame. Instead of monitoring a specific subframe defined by a PO, the PFW may enable paging to occur at a given subframe indicated by the equations (3) and (4) seen above and extended to a preconfigured contiguous subframe. The PFW is one way in which an LBT failure may be addressed because the paging message may be transmitted later in the time domain when a subsequent the LBT procedure succeeds.

When the unlicensed spectrum is used for narrowband communications, the base station may perform at least one LBT procedure at the start of each of the non-anchor hopping frame before communicating with the UE. The LBT procedure may be used to determine if the non-anchor hopping frame is currently being used for communications involving a different RAT (e.g., Wi-Fi). When the LBT procedure fails, the base station may determine that the non-anchor hopping frequency associated with that non-anchor hopping frame is occupied, and hence, unavailable for narrowband communications with the UE. Otherwise, when the LBT procedure succeeds, the base station may determine that the non-anchor hopping frequency is not occupied, and hence, is available for narrowband communications with the UE. In the instances when the PFW is located on a non-anchor hopping frequency in which the LBT procedure fails, the paging message may be delayed until the PFW in the subsequent DRX/eDRX cycle.

Figure 4:
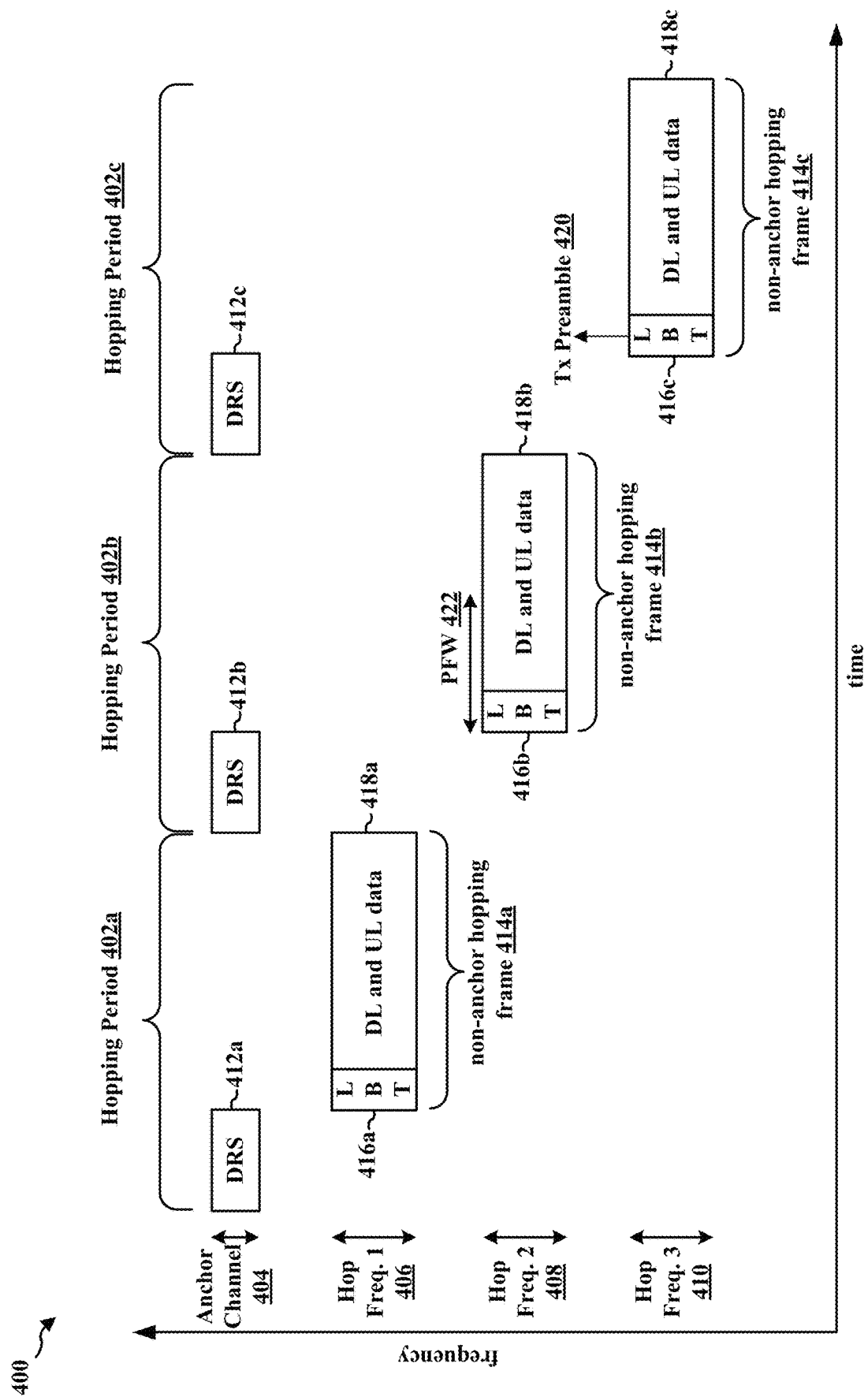
FIG. 4 illustrates a portion of a frame that includes multiple hopping periods used for narrowband communications in the unlicensed spectrum between a base station and a UE in accordance with certain aspects of the disclosure.

FIG. 4 illustrates a portion of a DRX/eDRX cycle 400 that includes multiple hopping periods used for narrowband communications in the unlicensed spectrum between a base station and a UE in accordance with certain aspects of the disclosure.

The portion of the DRX/eDRX cycle 400 illustrated in FIG. 4 includes three hopping periods 402a, 402b, 402c. Each of the hopping periods 402a, 402b, 402c may include an anchor hopping frame and a non-anchor hopping frame.

For example, the first hopping period 402a may include a first anchor hopping frame 412a located on an anchor channel 404 and a first non-anchor hopping frame 414a located in a first non-anchor channel 406. The first anchor hopping frame 412a may be used to carry DRS. The first non-anchor hopping frame 414a may include a first LBT portion 416a and a first data portion 418a.

The second hopping period 402b may include a second anchor hopping frame 412b located on the anchor channel 404 and a second non-anchor hopping frame 414b located on a second non-anchor channel 408. The second anchor hopping frame 412b may be used to carry DRS. The second non-anchor hopping frame 414b may include a second LBT portion 416b and a second data portion 418b.

The third hopping period 402c may include a third anchor hopping frame 412c located on the anchor channel 404 and a third non-anchor hopping frame 414c located on a third non-anchor hopping frequency 410. The third anchor hopping frame 412c may be used to carry DRS. The third non-anchor hopping frame 414c may include a third LBT portion 416c and a third data portion 418c.

The first LBT portion 416a, the second LBT portion 416b, and the third LBT portion 416c may include a predetermined number of subframes (e.g., 1 subframe, 2, subframes, 3, subframes, etc.), and the base station may attempt an LBT procedure at the beginning of each of the predetermined number of subframes of the LBT portions until an attempt of the LBT procedure is successful.

When one of the attempts of the LBT procedure is successful in a particular non-anchor hopping frame, a transmission (Tx) preamble 420 may be transmitted by the base station to indicate to the UE that DL and/or UL data communication may occur in that particular non-anchor hopping frame. Otherwise, when zero of the attempts of the LBT procedure are successful in a particular non-anchor hopping frame, the Tx preamble 420 may not transmitted, and DL and/or UL data communications may not occur on that particular non-anchor hopping frame.

For example, if the predetermined number of subframes in the first LBT portion 416a is two subframes, the base station may attempt the LBT procedure at the start of the first subframe. When the LBT procedure at the start of the first subframe is successful, the base station may transmit a Tx preamble 420 that indicates to the UE that the LBT procedure was successful, and may omit performing the LBT procedure at the start of the second subframe.

Otherwise, when the LBT procedure at the start of the first subframe is not successful, the base station may attempt the LBT procedure at the start of the second subframe. When the LBT procedure is successful at the start of the second subframe, the base station may transmit the Tx preamble 420 and DL and/or UL data communications may occur on the first non-anchor hopping frame 414a.

Otherwise, if the LBT procedure is not successful at the start of the second subframe, the Tx preamble 420 is not transmitted, and narrowband communications may not occur on the first non-anchor hopping frame 414a.

As mentioned above, the PO and/or PFW 422 may occur once within a DRX frame (or a PTW in the case of an eDRX frame). Thus, when the PO and/or PFW 422 is located in a non-anchor hopping frame in which zero of the LBT attempts are successful, a paging message may not be transmitted during that DRX cycle (e.g., also referred to as a DRX frame) and/or eDRX cycle (e.g., in the case of a PTW) and may not be retransmitted until the subsequent DRX cycle or eDRX cycle (e.g., also referred to as a eDRX frame). Postponing the transmission of the paging message until a subsequent DRX cycle and/or eDRX cycle may be detrimental since the UE may not receive the change in system information at the next modification boundary, and hence, may not monitor for the paging message in the correct PO and/or PW of the subsequent DRX cycle and/or eDRX cycle.

Thus, there is a need for paging mechanism the increases the chance of a UE receiving a paging message during a DRX cycle and/or a eDRX cycle.

The present disclosure provides a paging mechanism that uses a PSFW (e.g., multiple hopping periods each with a predetermined number of radio frames, e.g., 8 radio frames) with a PFW in each non-anchor hopping frame of PSFW. Hence, even when each of the available LBT attempts on one of the non-anchor hopping frames fails, each of the subsequent non-anchor hopping frames includes an opportunity to send the paging message to the UE during that DRX/eDRX frame. Using the techniques described below in connection with FIGS. 5-12, the chance of a UE receiving a paging message, and hence, the change in system information may be increased.

Figure 5:
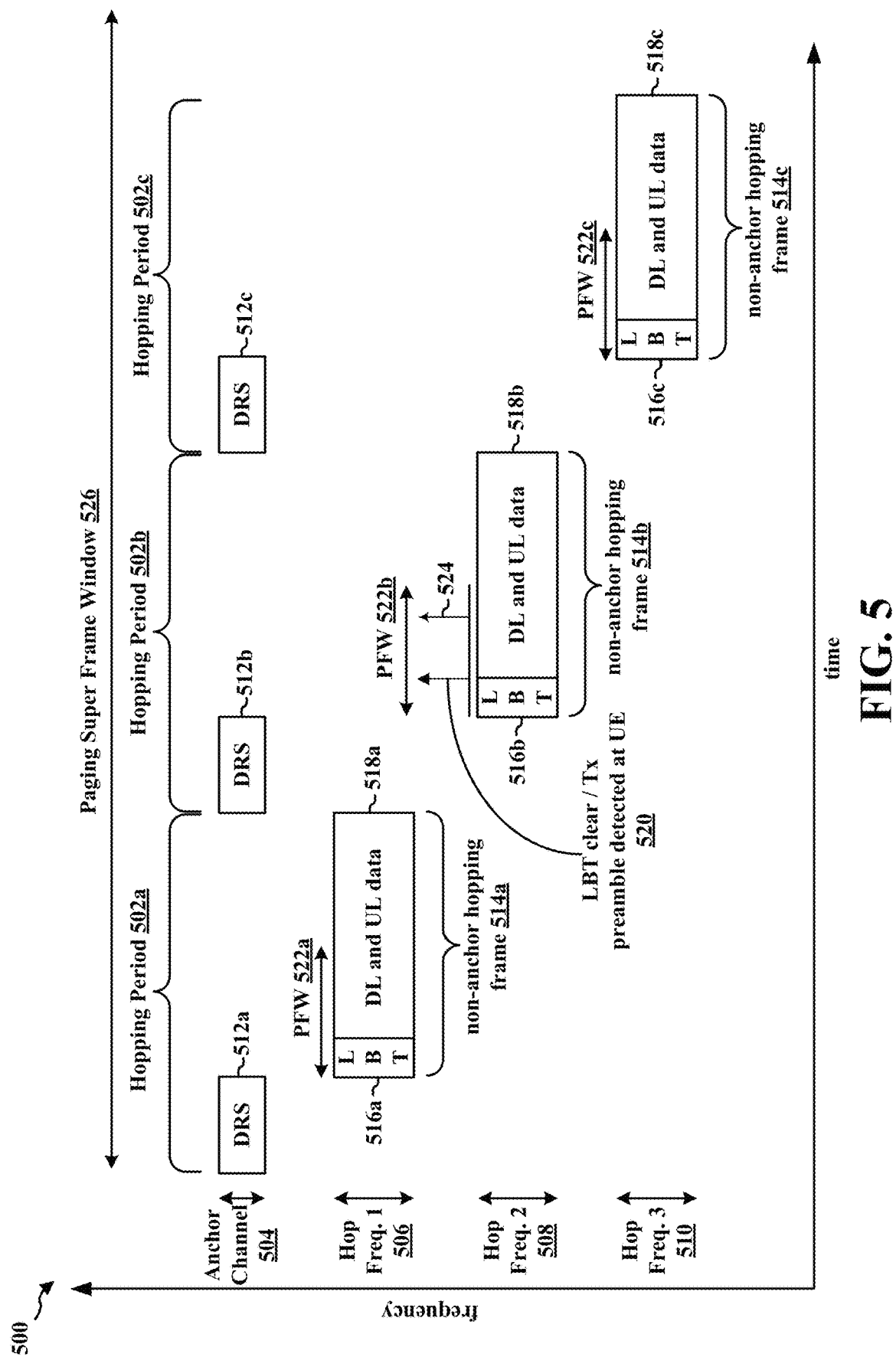
FIG. 5 illustrates a portion of a frame that includes multiple hopping periods used for narrowband communications in the unlicensed spectrum between a base station and a UE in accordance with certain aspects of the disclosure.

FIG. 5 illustrates a portion of a DRX/eDRX cycle 500 that includes multiple hopping periods used for narrowband communications in the unlicensed spectrum between a base station and a UE in accordance with certain aspects of the disclosure. As seen in FIG. 5, a PSFW 526 may be defined such that each of the non-anchor hopping frames 514a, 514b, 514c within a DRX/eDRX cycle 500 may include a respective PFW 522a, 522b, 522c.

The portion of the DRX/eDRX cycle 500 illustrated in FIG. 5 includes three hopping periods 502a, 502b, 502c. Each of the hopping periods 502a, 502b, 502c may include an anchor hopping frame and a non-anchor hopping frame. Although the portion of the DRX/eDRX frame illustrated in FIG. 5 is illustrated with three hopping periods 502a, 502b, 502c, the DRX/eDRX cycle 500 may include two hopping periods or more than three hopping periods without departing from the scope of the present disclosure.

As seen in FIG. 5, the first hopping period 502a may include a first anchor hopping frame 512a located on an anchor channel 504 and a first non-anchor hopping frame 514a located in a first non-anchor channel 506. The first anchor hopping frame 512a may be used to carry DRS. The first non-anchor hopping frame 514a may include a first LBT portion 516a, a first data portion 518a, and a first PFW 522a.

The second hopping period 502b may include a second anchor hopping frame 512b located on the anchor channel 504 and a second non-anchor hopping frame 514b located on a second non-anchor channel 508. The second anchor hopping frame 412b may be used to carry DRS. The second non-anchor hopping frame 514b may include a second LBT portion 516b, a second data portion 518b, and a second PFW 522b.

The third hopping period 502c may include a third anchor hopping frame 512c located on the anchor channel 504 and a third non-anchor hopping frame 514c located on a third non-anchor channel 510. The third anchor hopping frame 512c may be used to carry DRS. The third non-anchor hopping frame 514c may include a third LBT portion 516c, a third data portion 518c, and a third PFW 522c.

In certain configurations, the anchor channel 504, the first non-anchor channel 506, the second non-anchor channel 508, and the third non-anchor channel 510 may be contiguous narrowbands within the wideband channel. In certain other configurations, at least one of the anchor channel 504, the first non-anchor channel 506, the second non-anchor channel 508, and the third non-anchor channel 510 may be may be a non-contiguous with at least one adjacent narrowband channel. In certain other configurations, each of the anchor channel 504, the first non-anchor channel 506, the second non-anchor channel 508, and the third non-anchor channel 510 may be non-contiguous narrowbands within the wideband channel.

The first LBT portion 516a, the second LBT portion 516b, and the third LBT portion 516c may include a predetermined number of subframes (e.g., 1 subframe, 2, subframes, 3, subframes, etc.). The base station may attempt an LBT procedure at the beginning of each of the predetermined number of subframes in each of the LBT portions 516a, 516*b*, 516*c* until one of the attempts of the LBT procedure is successful in each of the non-anchor hopping frames 514*a*, 514*b*, 514*c*.

When one of the attempts of the LBT procedure is successful in a particular non-anchor hopping frame, a Tx preamble 520 may be transmitted by the base station. The Tx preamble 520 may indicate to the UE that DL and/or UL data communication may occur in that particular non-anchor hopping frame, and that a paging message 524 may be transmitted in the PFW in that particular non-anchor hopping frame. Once the LBT procedure is successful in a non-anchor hopping frame, further attempts of the LBT procedure in that non-anchor hopping frame may be omitted.

Otherwise, when zero of the attempts of the LBT procedure are successful in a particular non-anchor hopping frame, the Tx preamble 520 may not be transmitted in that particular non-anchor hopping frame, the paging message 524 may be not transmitted in the PFW in that particular non-anchor hopping frame, and DL and/or UL data communications may not occur on that particular non-anchor hopping frame.

For example, assume that the predetermined number of LBT procedure attempts is two, and zero of the two attempts of the LBT procedure are successful in the first LBT portion 516*a* of the first non-anchor hopping frame 514*a*. Hence, neither a Tx preamble nor a paging message may be transmitted in first non-anchor hopping frame 514*a*, and DL and/or UL communications may not occur in the first data portion 518*a* of the first non-anchor hopping frame 514*a*.

Turning to the second non-anchor hopping frame 514*b*, when the LBT procedure in the first subframe in the second LBT portion 516*b* is successful, the base station may transmit a Tx preamble 520 that indicates to the UE that the LBT procedure was successful, that a paging message may be sent in the second PFW 522*b*, and that at least one of DL and/or UL data communications may occur on the second data portion 518*b* of the second non-anchor hoping frame 514*b*. Following the transmission of the Tx preamble 520, a paging message 524 may be transmitted during the PFW 522*b* if the base station has a paging message to transmit. When the LBT procedure is successful at the first subframe in the second LBT portion 516*b*, any remaining attempts of the LBT procedure may be omitted in the second LBT portion 516*b*.

Otherwise, when the LBT procedure is not successful, the base station may attempt the LBT procedure at the start of the second subframe in the second non-anchor hopping frame 514*b*. When the LBT procedure is successful in the second subframe, the base station may transmit the Tx preamble 520. Following the transmission of the Tx preamble 520, the base station may transmit the paging message 524 during the second PFW 522*b*, and DL and/or UL data communications may occur in the second data portion 518*b*.

Otherwise, if zero of the attempts of the LBT procedure are successful in the second LBT portion 516*b*, neither of the Tx preamble 520 nor the paging message 524 may be transmitted in the second non-anchor hopping frame 514*b*, and narrowband communications may not occur in the second data portion 518*b*. However, because the third non-anchor hopping frame 514*c* includes a third PFW 522*c*, the base station has at least one other opportunity to transmit the paging message during the DRX/eDRX cycle 500 if an attempt of the LBT procedure in the third LBT portion 516*c* is successful.

Using the techniques described in connection with FIG. 5, even when all the available LBT attempts on the first non-anchor hopping frame 514*a* fail, each of the subsequent non-anchor hopping frames 514*b*, 514*c* includes a respective PFW 522*b*, 522*c* in which a paging message may be sent to the UE. Hence, by using a PSFW 526 that includes multiple PFW 522*a*, 522*b*, 522*c* within a DRX/eDRX frame, the chance of a UE receiving a paging message, and hence, a change in system information within the DRX/eDRX may be increased.

FIG. 6 illustrates a data flow 600 between a base station 602 and a UE 604 that may be used to increase the chance of a paging message transmission during a DRX cycle or an eDRX cycle in accordance with certain aspects of the disclosure. Base station 602 may correspond to, e.g., base station 102, 180, 310, 1150, apparatus 802/802'. UE 604 may correspond to, e.g., UE 104, 350, 850, the apparatus 1102/1102'. In addition, the base station 602 and the UE 604 may be configured to communicate using narrowband communications (e.g., NB-IoT and/or eMTC). In other words, the UE 604 may be an NB-IoT device and/or an eMTC device.

In certain configurations, the base station 602 may transmit (at 601) information indicating a PSFW that may be received by the UE 604. In certain aspects, the PSFW may include a plurality of non-anchor hopping frames. In certain other aspects, each of the plurality of non-anchor hopping frames may be located on a different non-anchor channel. In certain other aspects, each of the plurality of non-anchor hopping frames may include a PFW. In certain other aspects, the PSFW may include a plurality of hopping periods. In certain other aspects, each of the plurality of hopping periods may include an anchor hopping frame and one of the plurality of non-anchor hopping frames. In certain other aspects, the anchor hopping frame in each of the plurality of hopping periods is located on a same anchor channel. In certain other aspects, each of the plurality of each of the plurality of hopping periods may include one or more radio frames.

For example, the information transmitted (at 601) by the base station 602 may indicate one or more of the PSFW 526, the first hopping period 502*a* (e.g., 80 radio frames), the second hopping period 502*b* (e.g., 80 radio frames), the third hopping period 502*c* (e.g., 80 radio frames), the anchor channel 504, the first non-anchor channel 506, the second non-anchor channel 508, the third non-anchor channel 510, the first anchor hopping frame 512*a*, the second anchor hopping frame 512*b*, the third anchor hopping frame 512*c*, the first non-anchor hopping frame 514*a* with the first PFW 522*a*, the second non-anchor hopping frame 514*b* with the second PFW 522*b*, the third non-anchor hopping frame 514*c* with the third PFW 522*c* illustrated in FIG. 5.

In certain other configurations, the base station 602 may transmit (at 603) at least one DRS during each of the anchor hopping frames. For example, the base station 602 may transmit at least one DRS during each of the first anchor hopping frame 512*a*, the second anchor hopping frame 512*b*, and the third anchor hopping frame 512*c* illustrated in FIG. 5.

In certain other configurations, the base station 602 may perform (at 605) an LBT procedure up to a threshold number of attempts at a frame boundary of each of the plurality non-anchor hopping frames in the PSFW. In one aspect, the LBT procedure may be performed until one of the attempts succeeds.

For example, the base station 602 may perform (at 605) the LBT procedure at the start of each subframe in the first LBT portion 516*a* of the first non-anchor hopping frame 514*a* until one of the attempts is successful. If the first LBT portion 516*a* has three subframes, the base station 602 may perform the LBT procedure once during each of the subframes in the first LBT portion 516a.

When the LBT procedure attempt is unsuccessful in the first subframe of the first LBT portion 516a, the base station 602 may perform the LBT procedure in the second subframe. However, if the LBT procedure performed in the first subframe is successful, no further attempts of the LBT procedure may be performed by the base station 602 during the first LBT portion 516a of the first non-anchor hopping frame 514a.

When the LBT procedure attempt is unsuccessful in the second subframe of the first LBT portion 516a, the base station 602 may perform the LBT procedure in the third subframe. However, if the LBT procedure performed in the second subframe is successful, the LBT procedure is not attempted by the base station 602 during the third subframe of the first LBT portion 516a of the first non-anchor hopping frame 514a.

In certain other configurations, the UE 604 may monitor (at 607) a predetermined number of subframes in each of the plurality of non-anchor hopping frames for a Tx preamble. For example, the UE 604 may monitor (at 607) the first LBT portion 516a at the beginning of the first non-anchor hopping frame 514a, the second LBT portion 516b at the beginning of the second non-anchor hopping frame 514b, and the third LBT portion 516c at the beginning of the third non-anchor hopping frame 514c for the Tx preamble 520 illustrated in FIG. 5.

In certain other configurations, the UE 604 may enter (at 609) a sleep mode for a remainder of each of the plurality of non-anchor hopping frames in which the transmission preamble is unreceived. The sleep mode may include a reduced power mode in which the UE 604 uses less power than if the UE 604 remains in a wake mode to monitor for DL communications and/or to transmit UL communications. For example, the UE 604 may enter (at 609) a sleep mode for the first data portion 518a of the first non-anchor hopping frame 514a when a Tx preamble is not received during the first LBT portion 516a. In certain other implementations, the sleep mode may include a "micro-sleep" mode that entered by the UE 604 and is different than DRX. The UE 604 may enter the micro-sleep mode any time, so long as the micro-sleep respects the monitoring/transmission schedule associated with the UE 604.

In certain other configurations, the base station 602 may transmit (at 611) a Tx preamble in each of the plurality of non-anchor hopping frames in which the LBT procedure succeeds. For example, the base station 602 may transmit (at 611) the Tx preamble 520 in the second LBT portion 516b of the second non-anchor hopping frame 514b when one of the LBT procedure attempts succeeds.

In certain other configurations, the UE 604 may monitor (at 613) for a paging message in the paging frame window of at least one first non-anchor hopping frame of the plurality of non-anchor hopping frames in which a transmission preamble is received from the base station. For example, the UE 604 may monitor (at 613) the second PFW 522b in the second non-anchor hopping frame 514b for the paging message 524 because the Tx preamble 520 is received during the second LBT portion 516b.

In certain other configurations, the base station 602 may transmit (at 615) the paging message in the paging frame window of at least one first non-anchor hopping frame in the PSFW in which the LBT procedure succeeds. In certain aspects, the paging message may be transmitted after the Tx preamble. The UE 604 may receive the paging message during the paging window of the at least one first non-anchor hopping frame in which a Tx preamble is received. For example, the base station 602 may transmit (at 615) the paging message 524 during the second PFW 522b when at least one of the LBT procedure attempts performed during the second LBT portion 516b succeeds, as illustrated in FIG. 5.

In certain other configurations, the base station 602 may transmit (at 617) first data to the at least one UE 604 in each of the plurality of non-anchor hopping frames in which the LBT procedure succeeds. For example, the base station 602 may transmit (at 617) DL data (e.g., first data) that is received by the UE 604 during the second data portion 518b of the second non-anchor hopping frame 514b illustrated in FIG. 5.

In certain other configurations, the UE 604 may transmit (at 619) second data to the base station 602 in each of the plurality of non-anchor hopping frames in which the transmission preamble is received. For example, the UE 604 may transmit (at 619) UL data (e.g., second data) that is received by the base station 602 during the second data portion 518b of the second non-anchor hopping frame 514b illustrated in FIG. 5.

Figure 7A:
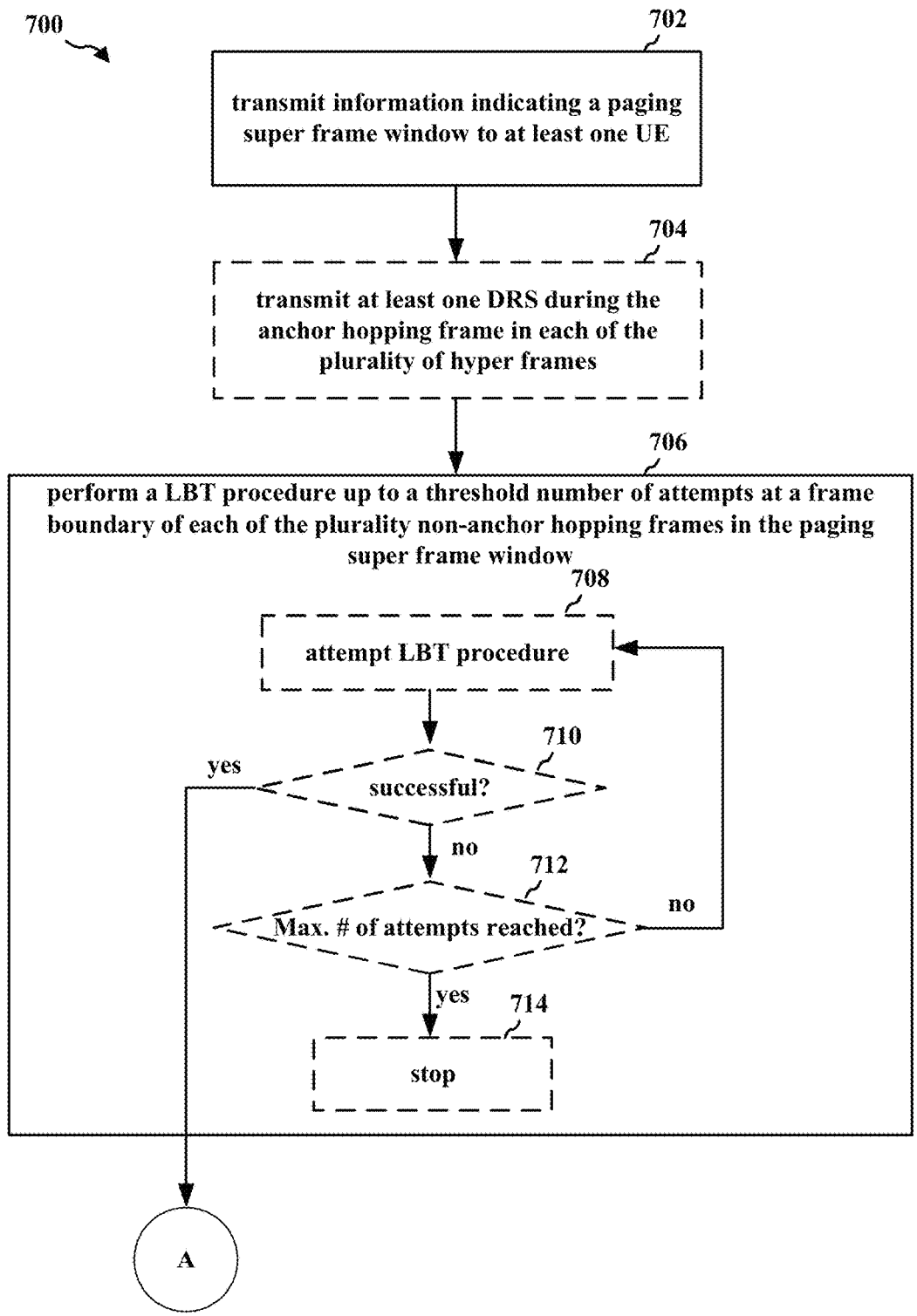
FIGS. 7A and 7B are a flowchart of a method of wireless communication.
Figure 7B:
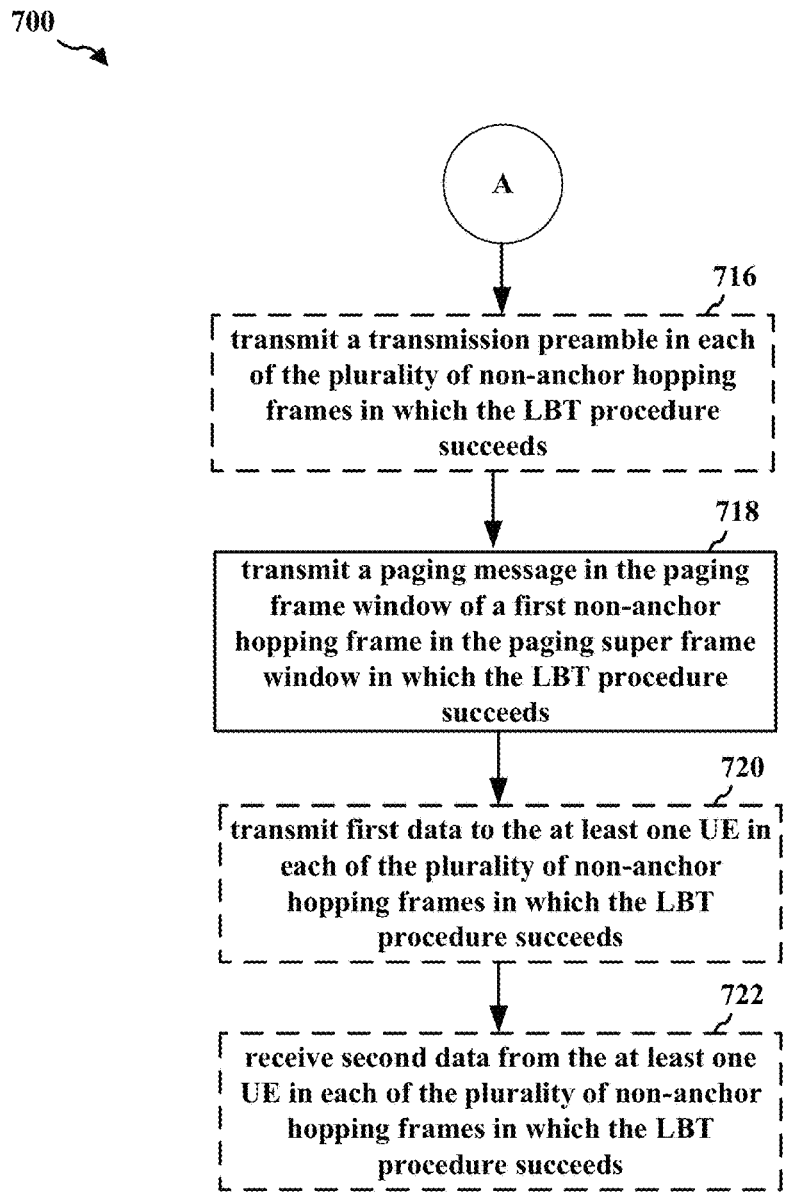

FIGS. 7A and 7B are a flowchart 700 of a method of wireless communication. The method may be performed by a base station (e.g., base station 102, 180, 310, 602, 1150, apparatus 802/802'). In FIGS. 7A and 7B, optional operations are indicated with dashed lines.

Referring to FIG. 7A, at 702, the base station may transmit information indicating a paging super frame window to at least one UE. In certain aspects, the paging super frame window may include a plurality of non-anchor hopping frames. In certain other aspects, each of the plurality of non-anchor hopping frames may be located on a different non-anchor channel. In certain other aspects, each of the plurality of non-anchor hopping frames may include a PFW. In certain other aspects, the PSFM may include a plurality of hopping periods. In certain other aspects, each of the plurality of hopping periods may include an anchor hopping frame and one of the plurality of non-anchor hopping frames. In certain other aspects, the anchor hopping frame in each of the plurality of hopping periods is located on a same anchor channel. In certain other aspects, each of the plurality of each of the plurality of hopping periods may include one or more radio frames. For example, referring to FIGS. 5 and 6, the base station 602 may transmit (at 601) information indicating a PSFW that is received by the UE 604. For example, the information transmitted (at 601) by the base station 602 may indicate one or more of the PSFW 526, the first hopping period 502a (e.g., 80 radio frames), the second hopping period 502b (e.g., 80 radio frames), the third hopping period 502c (e.g., 80 radio frames), the anchor hopping 504, the first non-anchor channel 506, the second non-anchor channel 508, the third non-anchor channel 510, the first anchor hopping frame 512a, the second anchor hopping frame 512b, the third anchor hopping frame 512c, the first non-anchor hopping frame 514a with the first PFW 522a, the second non-anchor hopping frame 514b with the second PFW 522b, the third non-anchor hopping frame 514c with the third PFW 522c illustrated in FIG. 5.

At 704, the base station may transmit at least one DRS during the anchor hopping frame in each of the plurality of hopping periods. For example, referring to FIGS. 5 and 6, the base station 602 may transmit (at 603) at least one DRS during each of the anchor hopping frames. For example, the base station 602 may transmit at least one DRS during each of the first anchor hopping frame 512a, the second anchor hopping frame 512b, and the third anchor hopping frame 512c illustrated in FIG. 5.

At 706, the base station may perform an LBT procedure up to a threshold number of attempts at a frame boundary of each of the plurality non-anchor hopping frames in the PSFW. In certain aspects, the LBT procedure may be performed until one of the attempts succeeds. For example, referring to FIG. 6, the base station 602 may perform (at 605) an LBT procedure up to a threshold number of attempts at a frame boundary of each of the plurality non-anchor hopping frames in the PSFW.

At 708, the base station may perform the LBT procedure by attempting the LBT procedure at a frame boundary of one of the plurality of non-anchor hopping frames in the PSFW. For example, referring to FIGS. 5 and 6, the base station 602 may perform (at 605) the LBT procedure at the start of each subframe in the first LBT portion 516a of the first non-anchor hopping frame 514a until one of the attempts is successful. If the first LBT portion 516a has three subframes, the base station 602 may being performing the LBT procedure by attempting LBT during the first subframe.

At 710, the base station may perform the LBT procedure by determining if the attempt of the LBT procedure is successful. When the attempt of the LBT procedure is successful (at 710), the operation may continue at 716 in FIG. 7B.

Otherwise, when the attempt of the LBT procedure is unsuccessful (at 710), the operation may continue at 712, where the base station determines if the threshold number of attempts is reached. When the base station determines (at 712) that the threshold number of attempts is not reached, the operation returns to 708. For example, referring to FIGS. 5 and 6, when the LBT procedure attempt is unsuccessful in the first subframe of the first LBT portion 516a, the base station 602 may perform the LBT procedure in the second subframe.

Otherwise, when the base station determines (at 712) that the threshold number of attempts is reached, the operation may continue at 714, where the base station does not perform another LBT procedure until the subsequent non-anchor hopping frame. For example, referring to FIGS. 5 and 6, if the first LBT portion 516a in the first non-anchor hopping frame 514a has three subframes, three attempts of the LBT procedure may be performed by the base station 602. Once the base station has attempted the LBT procedure three times during the first LBT portion 516a, the base station 602 may not attempt the LBT procedure again until the start of the second LBT portion 516b.

Referring to FIG. 7B, at 716, the base station may transmit a transmission preamble in each of the plurality of non-anchor hopping frames in which the LBT procedure succeeds. For example, referring to FIGS. 5 and 6, the base station 602 may transmit (at 611) the Tx preamble 520 in the second LBT portion 516b of the second non-anchor hopping frame 514b when one of the LBT procedure attempts succeeds.

At 718, the base station may transmit a paging message in the paging frame window of at least one first non-anchor hopping frame in the PSFW in which the LBT procedure succeeds. In certain configurations, the paging message may be transmitted after the transmission preamble. Referring to FIGS. 5 and 6, the base station 602 may transmit (at 615) the paging message 524 during the second PFW 522b when at least one of the LBT procedure attempts performed during the second LBT portion 516b succeeds.

At 720, the base station may transmit first data to the at least one UE in each of the plurality of non-anchor hopping frames in which the LBT procedure succeeds. For example, referring to FIGS. 5 and 6, the base station 602 may transmit (at 617) DL data (e.g., first data) that is received by the UE 604 during the second data portion 518b of the second non-anchor hopping frame 514b illustrated in FIG. 5.

At 722, the base station may receive second data from the at least one UE in each of the plurality of non-anchor hopping frames in which the LBT procedure succeeds. For example, referring to FIGS. 5 and 6, the UE 604 may transmit (at 619) UL data (e.g., second data) that is received by the base station 602 during the second data portion 518b of the second non-anchor hopping frame 514b.

Figure 8:
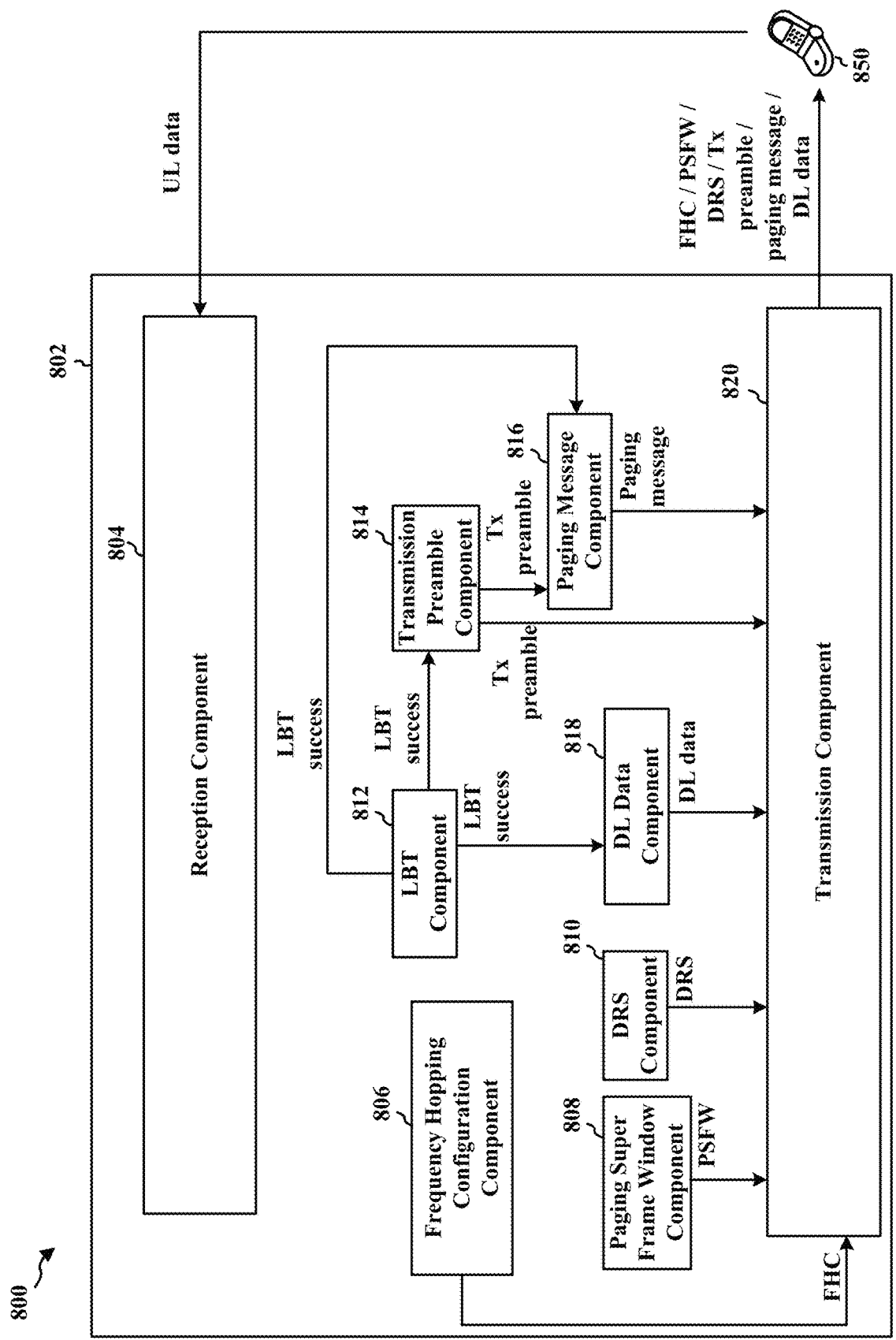
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a base station (e.g., base station 102, 180, 310, 602, 1150, apparatus 802') in communication with a UE 850 (e.g., UE 104, 350, 604, the apparatus 1102/1102'). The apparatus may include a reception component 804, a frequency hopping configuration (FHC) component 806, a PSFW component 808, a DRS component 810, an LBT component 812, a Tx preamble component 814, a paging message component 816, a DL data component 818, and a transmission component 820.

In certain configurations, the FHC component 806 may be configured to determine an FHC that includes a plurality of narrowband channels within a wideband channel. In certain aspects, the FHC may include a subset of the narrowband channels available within the wideband channel. The FHC component 806 may send a signal associated with the determined FHC to the transmission component 820. The transmission component 820 may be configured to transmit information associated with the FHC to the UE 850.

In certain other configurations, the PSFW component 808 may be configured to determine a PSFM. In certain aspects, the PSFW may include a plurality of non-anchor hopping frames. In certain other aspects, each of the plurality of non-anchor hopping frames may be located on a different non-anchor channel. In certain other aspects, each of the plurality of non-anchor hopping frames may include a PFW. In certain other aspects, the PSFM may include a plurality of hopping periods. In certain other aspects, each of the plurality of hopping periods may include an anchor hopping frame and one of the plurality of non-anchor hopping frames. In certain other aspects, the anchor hopping frame in each of the plurality of hopping periods is located on a same anchor channel. The PSFW component 808 may be configured to send a signal associated with the determined PSFM to the transmission component 820. The transmission component 820 may be configured to transmit information indicating the PSFW to at least one UE 850.

In certain other configurations, the DRS component 810 may be configured to generate at least one DRS associated with each hopping period in a plurality of hopping periods. The DRS component 810 may be configured to send a signal associated with the DRS to the transmission component. The transmission component 820 may be configured to transmit at least one DRS during the anchor hopping frame in each of the plurality of hopping periods.

In certain other configurations, the LBT component 812 may be configured to perform an LBT procedure up to a threshold number of attempts at a frame boundary of each of the plurality non-anchor hopping frames in the paging super frame window. In certain aspects, the LBT procedure may be performed until one of the attempts succeeds. In certain aspects, the LBT component 812 may be configured to perform the LBT procedure by attempting the LBT procedure at a frame boundary of one of the plurality of non-anchor hopping frames in the paging super frame window. In certain other aspects, the LBT component 812 may be configured to perform the LBT procedure by determining if the attempt of the LBT procedure is successful. In certain other aspects, when the attempt of the LBT procedure is successful, the LBT component 812 may send a signal indicating the LBT procedure was successful to one or more of the Tx preamble component 814, the paging message component 816, and/or the DL data component 818. Otherwise, when the attempt of the LBT procedure is unsuccessful, the LBT component 812 may be configured to determine if the threshold number of attempts is reached. When the LBT component 812 determines that the threshold number of attempts is not reached, the LBT component 812 may be configured to perform the LBT procedure by performing a subsequent LBT procedure attempt. Otherwise, when the LBT component 812 determines that the threshold number of attempts is reached, the LBT component 812 may wait for a subsequent non-anchor hopping frame before performing another LBT procedure.

In certain other configurations, the Tx preamble component 814 may be configured to generate a Tx preamble when the signal indicating LBT procedure success is received from the LBT component 812. The Tx preamble component 814 may be configured to send a signal associated with the Tx preamble to the transmission component 820. The transmission component 820 may be configured to transmit a Tx preamble in each of the plurality of non-anchor hopping frames in which the LBT procedure succeeds.

In certain other configurations, the paging message component 816 may be configured to generate a paging message when the signal indicating LBT procedure success is received from the LBT component 812. The paging message component 816 may be configured to send a signal associated with the paging message to the transmission component 820. The transmission component 820 may be configured to transmit a paging message in the paging frame window of at least one first non-anchor hopping frame in the paging super frame window in which the LBT procedure succeeds. In certain configurations, the paging message may be transmitted after the transmission preamble.

In certain other configurations, the DL data component 818 may be configured to generate DL data for the UE 850. The DL data component 818 may be configured to send a signal associated with the DL data to the transmission component 820. The transmission component 820 may be configured to transmit first data (e.g., DL data) to the at least one UE 850 in each of the plurality of non-anchor hopping frames in which the LBT procedure succeeds.

In certain other configurations, the reception component 804 may be configured to receive second data (e.g., UL data) from the at least one UE 850 in each of the plurality of non-anchor hopping frames in which the LBT procedure succeeds.

Figure 9:
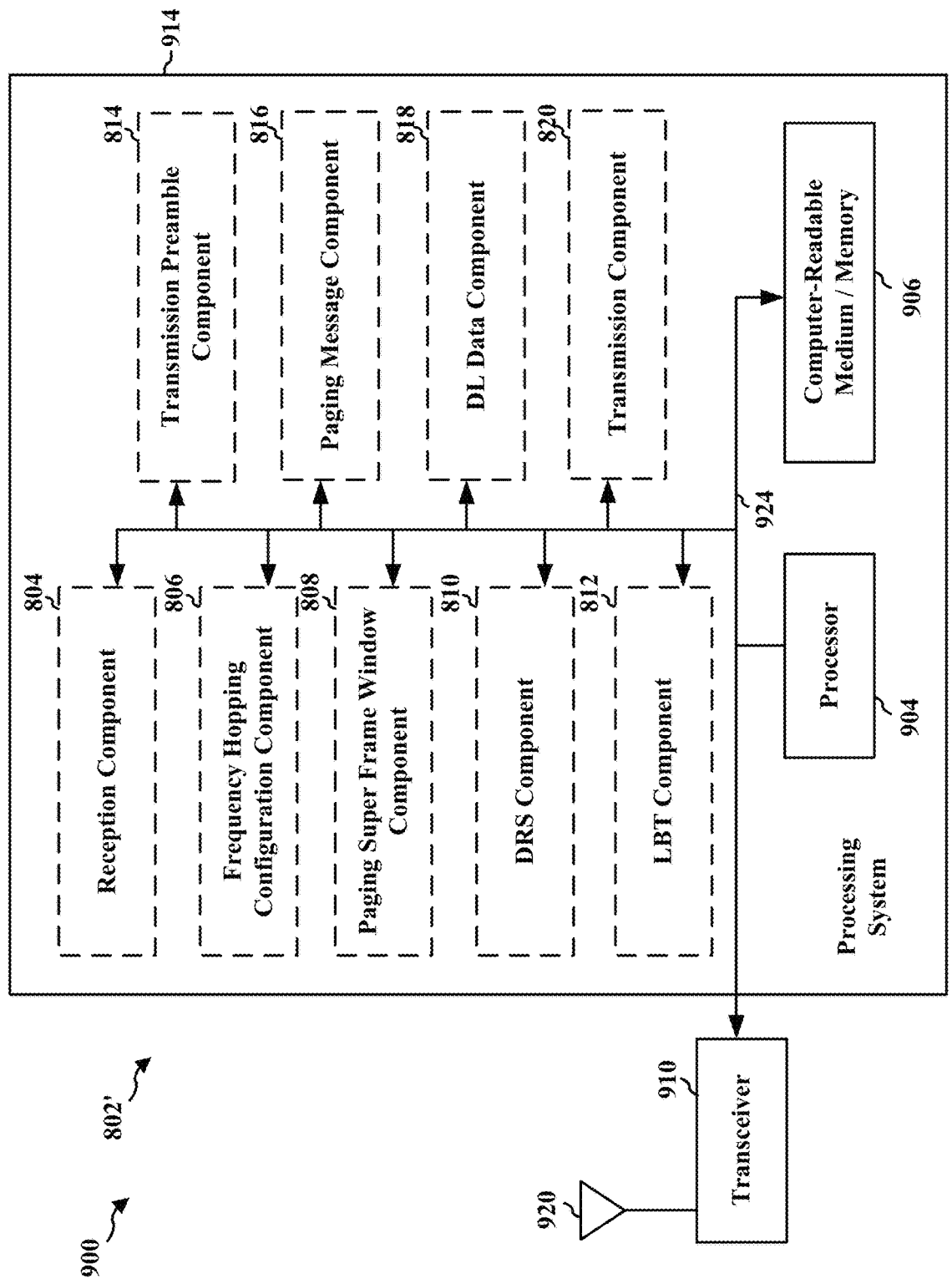
FIG. 9 is a diagram illustrating an example of a hardware implementation for an apparatus employing a processing system.

The apparatus may include additional components that perform each of the blocks of the algorithm in the aforementioned flowcharts of FIGS. 7A and 7B. As such, each block in the aforementioned flowcharts of FIGS. 7A and 7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, 818, 820 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 820, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816, 818, 820. The components may be software components running in the processor 904, resident/stored in the computer readable medium/memory 906, one or more hardware components coupled to the processor 904, or some combination thereof. The processing system 914 may be a component of the base station 310 and may include the memory 376 and/or at least one of the TX processor 316, the RX processor 370, and the controller/processor 375.

In one configuration, the apparatus 802/802' for wireless communication may include means for transmitting information indicating a paging super frame window to at least one UE. In certain aspects, the paging super frame window may include a plurality of non-anchor hopping frames. In certain other aspects, each of the plurality of non-anchor hopping frames may be located on a different non-anchor channel. In certain other aspects, each of the plurality of non-anchor hopping frames may include a PFW. In certain other aspects, the PSFM may include a plurality of hopping periods. In certain other aspects, each of the plurality of hopping periods may include an anchor hopping frame and one of the plurality of non-anchor hopping frames. In certain other aspects, the anchor hopping frame in each of the plurality of hopping periods is located on a same anchor channel. In certain other aspects, each of the plurality of each of the plurality of hopping periods may include one or more radio frames. In certain other configurations, the apparatus 802/802' for wireless communication may include means for transmitting at least one DRS during the anchor hopping frame in each of the plurality of hopping periods. In certain other configurations, the apparatus 802/802' for wireless communication may include means for performing an LBT procedure up to a threshold number of attempts at a frame boundary of each of the plurality non-anchor hopping frames in the paging super frame window. In certain aspects, the LBT procedure may be performed until one of the attempts succeeds. In certain other aspects, the means for performing the LBT procedure may be configured to attempt the LBT procedure at a frame boundary of one of the plurality of non-anchor hopping frames in the paging super frame window. In certain other aspects, the means for performing the LBT procedure may be configured to determine if the attempt of the LBT procedure is successful. In certain other aspects, the means for performing the LBT procedure may be configured to determine if the threshold number of attempts is reached when an LBT procedure is unsuccessful. In certain other aspects, the means for performing the LBT procedure may be configured to perform a subsequent LBT procedure attempt upon determining that the threshold number is not reached. In certain other aspects, the means for performing the LBT procedure may be configured to wait to perform a subsequent LBT procedure attempt until a subsequent non-anchor hopping frame upon determining that the threshold number of LBT attempts is reached. In certain other configurations, the apparatus 802/802' for wireless communication may include means for transmitting a transmission preamble in each of the plurality of non-anchor hopping frames in which the LBT procedure succeeds. In certain other configurations, the apparatus 802/802' for wireless communication may include means for transmitting a paging message in the paging frame window of at least one first non-anchor hopping frame in the paging super frame window in which the LBT procedure succeeds. In certain configurations, the paging message may be transmitted after the transmission preamble. In certain other configurations, the apparatus 802/802' for wireless communication may include means for transmitting first data to the at least one UE in each of the plurality of non-anchor hopping frames in which the LBT procedure succeeds. In certain other configurations, the apparatus 802/802' for wireless communication may include means for receiving second data from the at least one UE in each of the plurality of non-anchor hopping frames in which the LBT procedure succeeds. The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
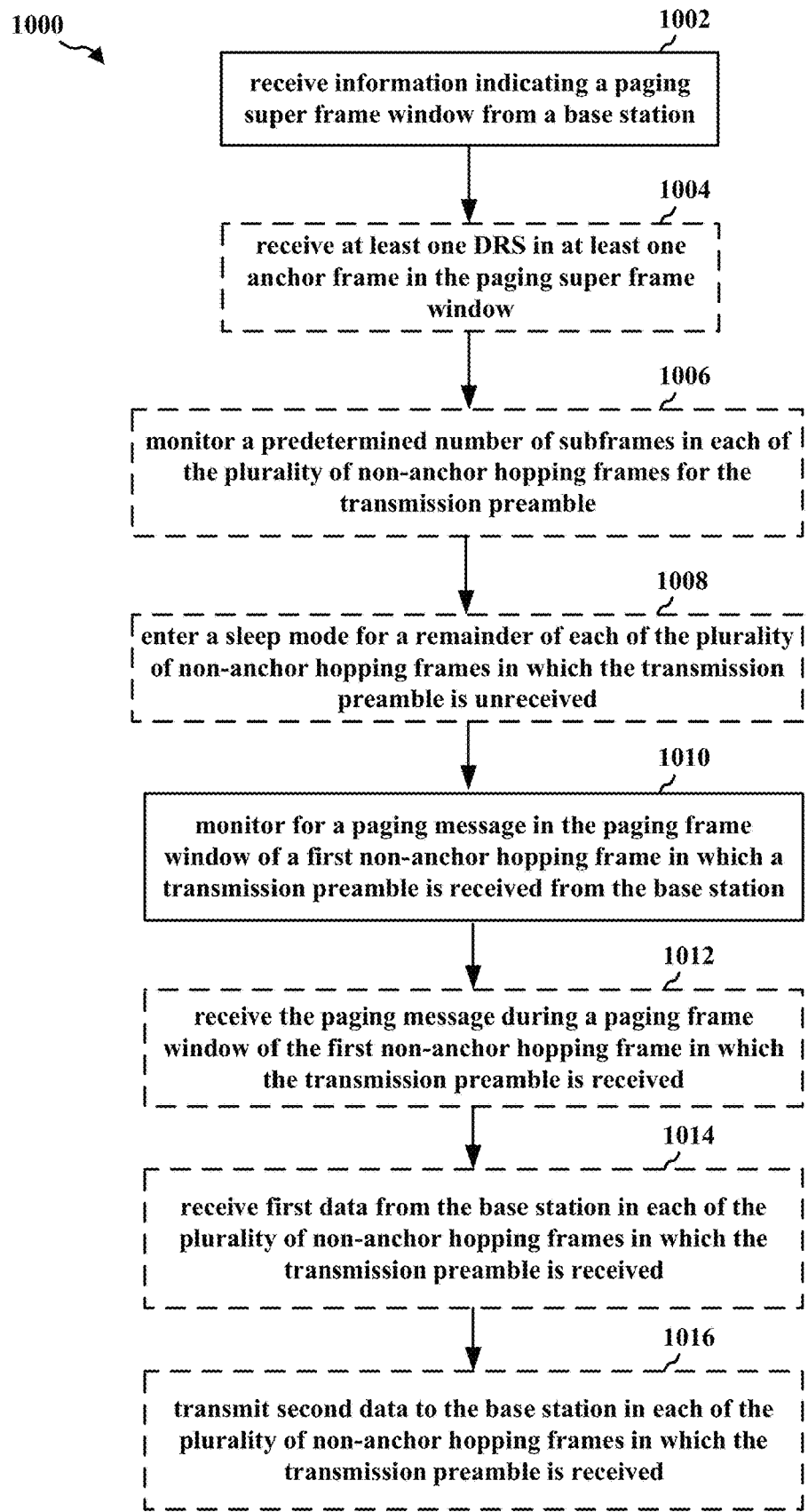
FIG. 10 is a flowchart of a method of wireless communication.

FIG. 10 is a flowchart 1000 of a method of wireless communication. The method may be performed by a UE (e.g., UE 104, 350, 604, 850, the apparatus 1102/1102'). In FIG. 10, optional operations are indicated with dashed lines.

At 1002, the UE may receive information indicating a paging super frame window from a base station. In certain aspects, the paging super frame window may include a plurality of non-anchor hopping frames. In certain other aspects, each of the plurality of non-anchor hopping frames may be located on a different non-anchor channel. In certain other aspects, each of the plurality of non-anchor hopping frames may include a PFW. In certain other aspects, the PSFM may include a plurality of hopping periods. In certain other aspects, each of the plurality of hopping periods may include an anchor hopping frame and one of the plurality of non-anchor hopping frames. In certain other aspects, the anchor hopping frame in each of the plurality of hopping periods is located on a same anchor channel. In certain other aspects, each of the plurality of each of the plurality of hopping periods may include one or more radio frames. For example, referring to FIG. 6, the base station 602 may transmit (at 601) information indicating a PSFW that is received by the UE 604. For example, the information transmitted (at 601) by the base station 602 may indicate one or more of the PSFW 526, the first hopping period 502a (e.g., 80 radio frames), the second hopping period 502b (e.g., 80 radio frames), the third hopping period 502c (e.g., 80 radio frames), the anchor channel 504, the first non-anchor channel 506, the second non-anchor channel 508, the third non-anchor channel 510, the first anchor hopping frame 512a, the second anchor hopping frame 512b, the third anchor hopping frame 512c, the first non-anchor hopping frame 514a with the first PFW 522a, the second non-anchor hopping frame 514b with the second PFW 522b, the third non-anchor hopping frame 514c with the third PFW 522c illustrated in FIG. 5.

At 1004, the UE may receive at least one DRS in at least one anchor frame in the paging super frame window. For example, referring to FIG. 6, the base station 602 may transmit (at 603) at least one DRS during each of the anchor hopping frames that may be received by the UE 604. In certain aspects, the UE 604 may receive at least one DRS during each of the first anchor hopping frame 512a, the second anchor hopping frame 512b, and the third anchor hopping frame 512c illustrated in FIG. 5.

At 1006, the UE may monitor a predetermined number of subframes in each of the plurality of non-anchor hopping frames for the transmission preamble. For example, referring to FIG. 6, the UE 604 may monitor (at 607) a predetermined number of subframes in each of the plurality of non-anchor hopping frames for the transmission preamble. In certain aspects, the UE 604 may monitor (at 607) the first LBT portion 516a at the beginning of the first non-anchor hopping frame 514a, the second LBT portion 516b at the beginning of the second non-anchor hopping frame 514b, and the third LBT portion 516c at the beginning of the third non-anchor hopping frame 514c for the Tx preamble 520 illustrated in FIG. 5.

At 1008, the UE may enter a sleep mode for a remainder of each of the plurality of non-anchor hopping frames in which the transmission preamble is unreceived. For example, referring to FIG. 6, the UE 604 may enter (at 609) a sleep mode for a remainder of each of the plurality of non-anchor hopping frames in which the transmission preamble is unreceived. In certain aspects, the UE 604 may enter (at 609) a sleep mode for the first data portion 518a of the first non-anchor hopping frame 514a when a Tx preamble is not received during the first LBT portion 516a illustrated in FIG. 5.

At 1010, the UE may monitor for a paging message in the paging frame window of at least one first non-anchor hopping frame in which a transmission preamble is received from the base station. For example, referring to FIG. 6, the UE 604 may monitor (at 613) for a paging message in the paging frame window of at least one first non-anchor hopping frame of the plurality of non-anchor hopping frames in which a transmission preamble is received from the base station. In certain aspects, the UE 604 may monitor (at 613) the second PFW 522b in the second non-anchor hopping frame 514b for the paging message 524 when the Tx preamble 520 is received during the second LBT portion 516b.

At 1012, the UE may receive the paging message during the paging frame window of the at least one first non-anchor hopping frame in which the transmission preamble is received. In certain aspects, the paging message may be received after the transmission preamble. For example, referring to FIG. 6, the UE 604 may receive the paging message transmitted (at 615) by the base station 602 in the paging frame window of at least one first non-anchor hopping frame in the paging super frame window in which the LBT procedure succeeds. In certain aspects, the paging message may be received after the Tx preamble. The UE 604 may receive the paging message during the paging window of the at least one first non-anchor hopping frame in which a Tx preamble is received. For example, the base station 602 may transmit (at 615) the paging message 524 during the second PFW 522b when at least one of the LBT procedure attempts performed during the second LBT portion 516b succeeds, as illustrated in FIG. 5.

At 1014, the UE may receive first data from the base station in each of the plurality of non-anchor hopping frames in which the transmission preamble is received. For example, referring to FIG. 6, the UE 604 may receive first data transmitted (at 617) by the base station 602 in each of the plurality of non-anchor hopping frames in which the LBT procedure succeeds. In certain aspects, the base station 602 may transmit (at 617) DL data (e.g., first data) that is received by the UE 604 during the second data portion 518b of the second non-anchor hopping frame 514b illustrated in FIG. 5.

At 1016, the UE may transmit second data to the base station in each of the plurality of non-anchor hopping frames in which the transmission preamble is received. For example, referring to FIG. 6, the UE 604 may transmit (at 619) second data to the base station 602 in each of the plurality of non-anchor hopping frames in which the transmission preamble is received. In certain aspects, the UE 604 may transmit (at 619) UL data (e.g., second data) that is received by the base station 602 during the second data portion 518b of the second non-anchor hopping frame 514b illustrated in FIG. 5.

Figure 11:
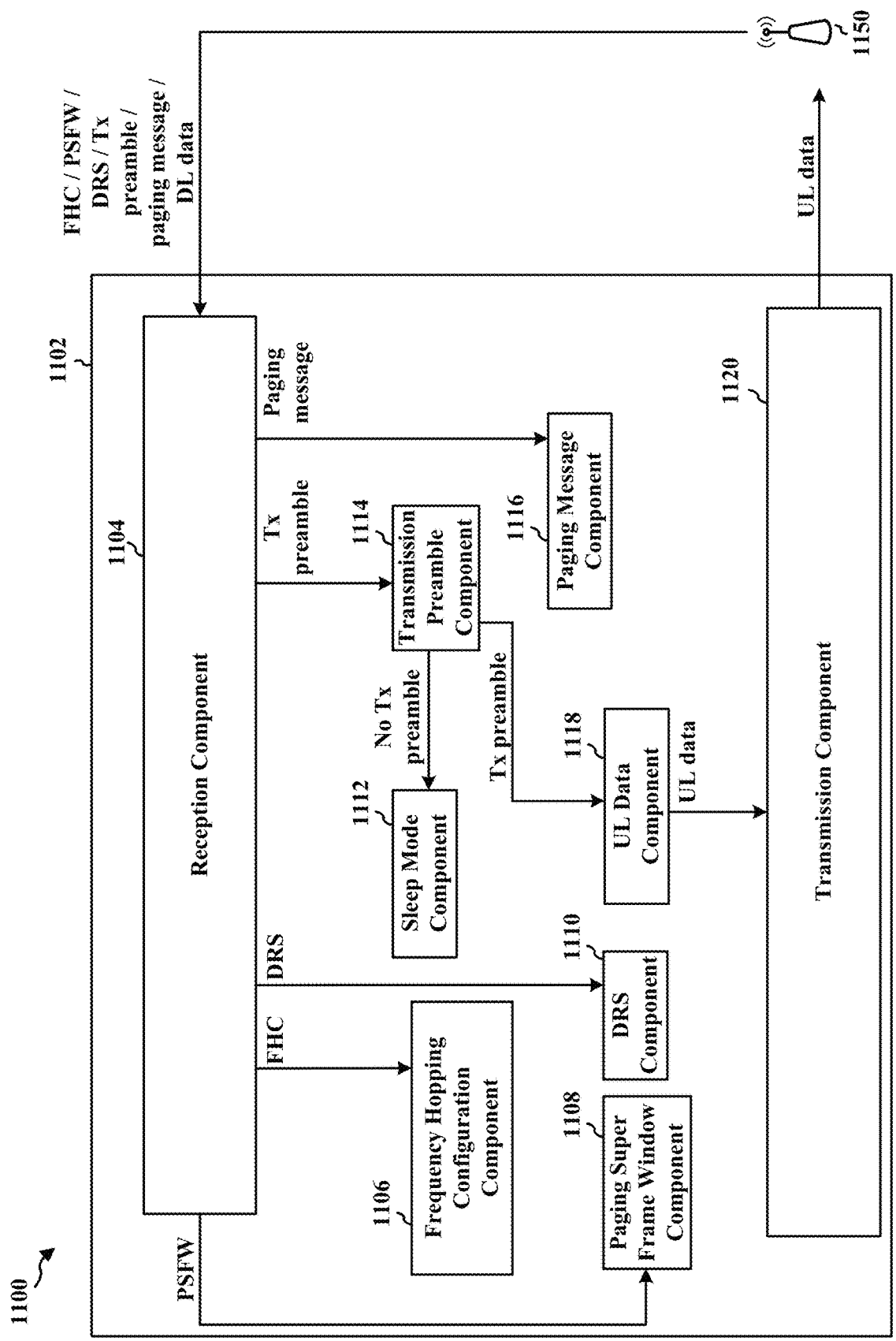
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE (e.g., UE 104, 350, 604, 850, the apparatus 1102') in communication with a base station 1150 (e.g., base station 102, 180, 310, 602, apparatus 802/802'). The apparatus may include a reception component 1104, a FHC component 1106, a PSFW component 1108, a DRS component 1110, a sleep mode component 1112, a Tx preamble component 1114, a paging message component 1116, a UL data component 1118, and a transmission component 1120.

In certain configurations, the reception component 1104 may be configured to receive information indicating a PSFW from the base station 1150. In certain aspects, the paging super frame window may include a plurality of non-anchor hopping frames. In certain other aspects, each of the plurality of non-anchor hopping frames may be located on a different non-anchor channel. In certain other aspects, each of the plurality of non-anchor hopping frames may include a PFW. In certain other aspects, the PSFM may include a plurality of hopping periods. In certain other aspects, each of the plurality of hopping periods may include an anchor hopping frame and one of the plurality of non-anchor hopping frames. In certain other aspects, the anchor hopping frame in each of the plurality of hopping periods is located on a same anchor channel. In certain other aspects, each of the plurality of each of the plurality of hopping periods may include one or more radio frames. The reception component 1104 may be configured to send a signal associated with the PSFW to the PSFW component 1108. The PSFW component 1108 may be configured to maintain information associated with the PSFW.

In certain other configurations, the reception component 1104 may be configured to receive at least one DRS in at least one anchor frame in the paging super frame window. The reception component 1104 may be configured to send a signal associated with the at least one DRS to the DRS component 1110. The DRS component 1110 may be configured to maintain information associated with the at least one DRS.

In certain other configurations, at least one of the reception component 1104 and/or the Tx preamble component 1114 may be configured to monitor a predetermined number of subframes in each of the plurality of non-anchor hopping frames for the transmission preamble. The reception component 1104 may be configured to receive the Tx preamble. The reception component 1104 may be configured to send a signal associated with the Tx preamble to the Tx preamble component 1114. Otherwise, when a Tx preamble is not received during the predetermined number of subframes, the Tx preamble component 1114 may be configured to send a signal to the sleep mode component 1112 indicating that no Tx preamble was received.

In certain configurations, the sleep mode component 1112 may be configured to enter a sleep mode for a remainder of each of the plurality of non-anchor hopping frames in which the transmission preamble is unreceived.

In certain other configurations, at least one of the reception component 1104 and/or the paging message component 1116 may be configured to may monitor for a paging message in the paging frame window of at least one first non-anchor hopping frame in which a transmission preamble is received from the base station 1150.

In certain configurations, the reception component 1104 may be configured to receive the paging message during the paging frame window of the at least one first non-anchor hopping frame in which the transmission preamble is received. In certain aspects, the paging message may be received after the transmission preamble. The reception component 1104 may be configured to send a signal associated with the paging message to the paging message component 1116.

In certain other configurations, the reception component 1104 may be configured to receive first data (e.g., DL data) from the base station in each of the plurality of non-anchor hopping frames in which the transmission preamble is received.

In certain other configurations, the UL data component 1118 may be configured to generate UL data. The UL data component 1118 may be configured to send a signal associated with the UL data to the transmission component 1120 when the Tx preamble is received.

In certain other configurations, the transmission component 1120 may be configured to transmit second data (e.g., UL data) to the base station in each of the plurality of non-anchor hopping frames in which the transmission preamble is received.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
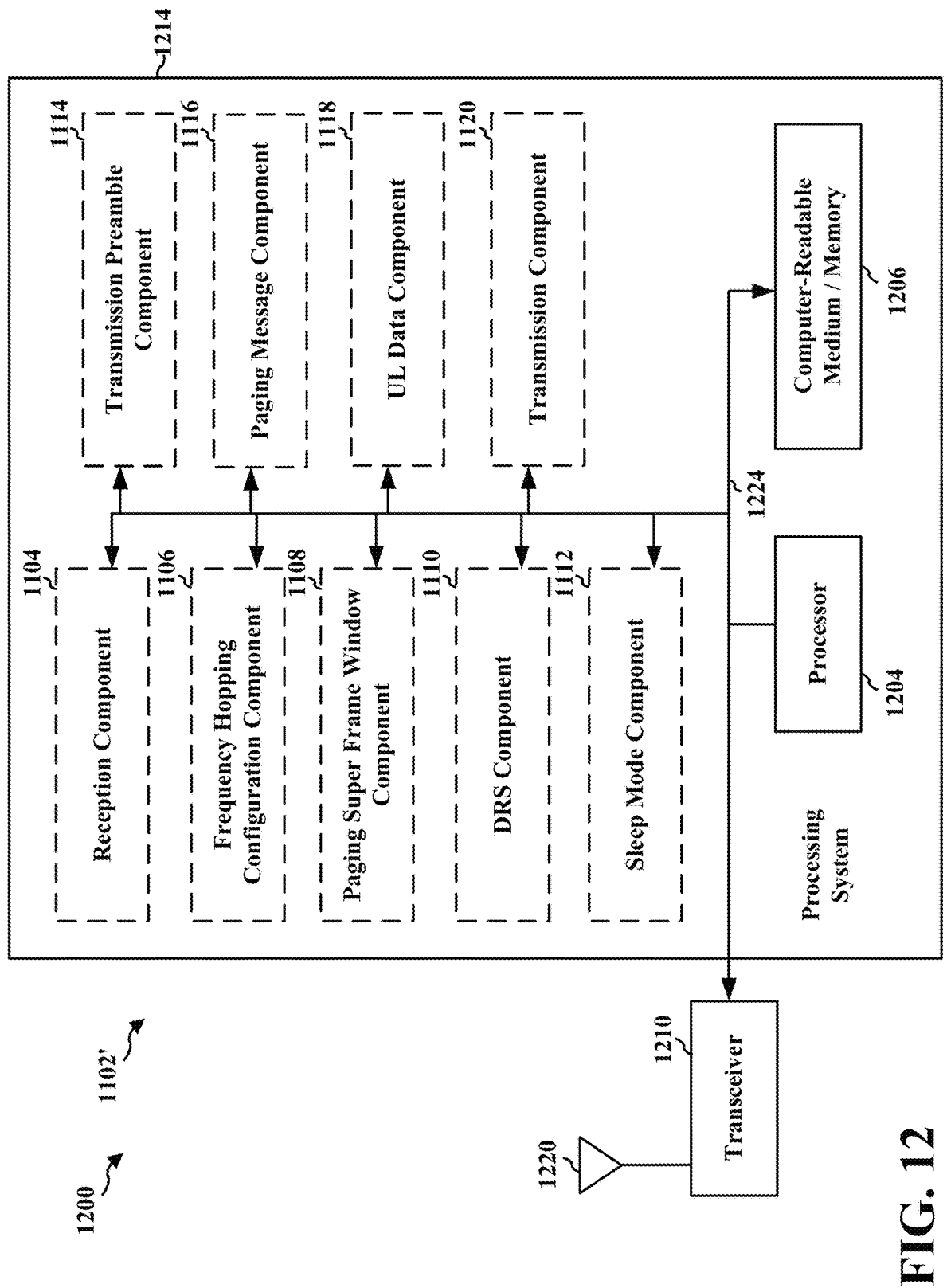
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1120, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In certain configurations, the apparatus 1102/1102' for wireless communication may include means for receiving information indicating a paging super frame window from a base station. In certain aspects, the paging super frame window may include a plurality of non-anchor hopping frames. In certain other aspects, each of the plurality of non-anchor hopping frames may be located on a different non-anchor channel. In certain other aspects, each of the plurality of non-anchor hopping frames may include a PFW. In certain other aspects, the PSFM may include a plurality of hopping periods. In certain other aspects, each of the plurality of hopping periods may include an anchor hopping frame and one of the plurality of non-anchor hopping frames. In certain other aspects, the anchor hopping frame in each of the plurality of hopping periods is located on a same anchor channel. In certain other aspects, each of the plurality of each of the plurality of hopping periods may include one or more radio frames. In certain other configurations, the apparatus 1102/1102' for wireless communication may include means for receiving at least one DRS in at least one anchor frame in the paging super frame window. In certain other configurations, the apparatus 1102/1102' for wireless communication may include means for monitoring a predetermined number of subframes in each of the plurality of non-anchor hopping frames for the transmission preamble. In certain other configurations, the apparatus 1102/1102' for wireless communication may include means for entering a sleep mode for a remainder of each of the plurality of non-anchor hopping frames in which the transmission preamble is unreceived. In certain other configurations, the apparatus 1102/1102' for wireless communication may include means for monitoring for a paging message in the paging frame window of at least one first non-anchor hopping frame in which a transmission preamble is received from the base station. In certain other configurations, the apparatus 1102/1102' for wireless communication may include means for receiving the paging message during the paging frame window of the at least one first non-anchor hopping frame in which the transmission preamble is received. In certain aspects, the paging message may be received after the transmission preamble. In certain other configurations, the apparatus 1102/1102' for wireless communication may include means for receiving first data from the base station in each of the plurality of non-anchor hopping frames in which the transmission preamble is received. In certain other configurations, the apparatus 1102/1102' for wireless communication may include means for transmitting second data to the base station in each of the plurality of non-anchor hopping frames in which the transmission preamble is received. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a base station, comprising:
    transmitting information indicating a paging super frame window to at least one UE, the paging super frame window including a plurality of non-anchor hopping frames, each of the plurality of non-anchor hopping frames being located on a different non-anchor channel, each of the plurality of non-anchor hopping frames including a paging frame window;
    performing a listen-before-talk (LBT) procedure up to a threshold number of attempts at a frame boundary of each of the plurality non-anchor hopping frames in the paging super frame window, the LBT procedure being performed until one of the attempts succeeds; and
    transmitting a paging message in the paging frame window of at least one first non-anchor hopping frame in the paging super frame window in which the LBT procedure succeeds.

2. The method of claim 1, further comprising:
    transmitting a transmission preamble in each of the plurality of non-anchor hopping frames in which the LBT procedure succeeds.

3. The method of claim 2, wherein the paging message is transmitted after the transmission preamble.

4. The method of claim 1, further comprising at least one of:
    transmitting first data to the at least one UE in each of the plurality of non-anchor hopping frames in which the LBT procedure succeeds; and
    receiving second data from the at least one UE in each of the plurality of non-anchor hopping frames in which the LBT procedure succeeds.

5. The method of claim 1, wherein:
    the paging super frame window includes a plurality of hopping periods;
    each of the plurality of hopping periods includes an anchor hopping frame and one of the plurality of non-anchor hopping frames; and
    the anchor hopping frame in each of the plurality of hopping periods is located on a same anchor channel.

6. The method of claim 5, further comprising:
    transmitting at least one discovery reference signal (DRS) during the anchor hopping frame in each of the plurality of hopping periods.

7. The method of claim 5, wherein each of the plurality of hopping periods includes one or more radio frames.

8. A method of wireless communication for a user equipment (UE), comprising:
    receiving information indicating a paging super frame window from a base station, the paging super frame window including a plurality of non-anchor hopping frames, each of the plurality of non-anchor hopping frames being located on a different non-anchor channel, each of the plurality of non-anchor hopping frames including a paging frame window; and
    monitoring for a paging message in the paging frame window of at least one first non-anchor hopping frame in which a transmission preamble is received from the base station.

9. The method of claim 8, further comprising:
    monitoring a predetermined number of subframes in each of the plurality of non-anchor hopping frames for the transmission preamble; and
    entering a sleep mode for a remainder of each of the plurality of non-anchor hopping frames in which the transmission preamble is unreceived.

10. The method of claim 8, further comprising:
    receiving the paging message during the paging frame window of the at least one first non-anchor hopping frame in which the transmission preamble is received, the paging message being received after the transmission preamble.

11. The method of claim 8, further comprising at least one of:
    receiving first data from the base station in each of the plurality of non-anchor hopping frames in which the transmission preamble is received; and
    transmitting second data to the base station in each of the plurality of non-anchor hopping frames in which the transmission preamble is received.

12. The method of claim 8, wherein:
    the paging super frame window includes a plurality of hopping periods;
    each of the plurality of hopping periods includes an anchor hopping frame and one of the plurality of non-anchor hopping frames; and
    the anchor hopping frame in each of the plurality of hopping periods is located on a same anchor channel.

13. The method of claim 12, further comprising:
    receiving at least one discovery reference signal (DRS) in at least one anchor frame in the paging super frame window.

14. The method of claim 12, wherein each of the plurality of hopping periods includes one or more radio frames.

15. An apparatus for wireless communication for a base station, comprising:
    a memory; and
    at least one processor coupled to the memory and configured to:

transmit information indicating a paging super frame window to at least one UE, the paging super frame window including a plurality of non-anchor hopping frames, each of the plurality of non-anchor hopping frames being located on a different non-anchor channel, each of the plurality of non-anchor hopping frames including a paging frame window;

perform a listen-before-talk (LBT) procedure up to a threshold number of attempts at a frame boundary of each of the plurality non-anchor hopping frames in the paging super frame window, the LBT procedure being performed until one of the attempts succeeds; and transmit a downlink message in the paging frame window of at least one first non-anchor hopping frame in the paging super frame window in which the LBT procedure succeeds.

16. The apparatus of claim 15, wherein the at least one processor is further configured to:
transmit a transmission preamble in each of the plurality of non-anchor hopping frames in which the LBT procedure succeeds.

17. The apparatus of claim 16, wherein the downlink message is transmitted after the transmission preamble.

18. The apparatus of claim 15, wherein the at least one processor is further configured to at least one of:
transmit first data to the at least one UE in each of the plurality of non-anchor hopping frames in which the LBT procedure succeeds; and
receive second data from the at least one UE in each of the plurality of non-anchor hopping frames in which the LBT procedure succeeds.

19. The apparatus of claim 15, wherein:
the paging super frame window includes a plurality of hopping periods;
each of the plurality of hopping periods includes an anchor hopping frame and one of the plurality of non-anchor hopping frames; and
the anchor hopping frame in each of the plurality of hopping periods is located on a same anchor channel.

20. The apparatus of claim 19, wherein the at least one processor is further configured to:
transmit at least one discovery reference signal (DRS) during the anchor hopping frame in each of the plurality of hopping periods.

21. The apparatus of claim 19, wherein each of the plurality of hopping periods includes one or more radio frames.

22. An apparatus of wireless communication for a user equipment (UE), comprising:
a memory; and
at least one processor coupled to the memory and configured to:
receive information indicating a paging super frame window from a base station, the paging super frame window including a plurality of non-anchor hopping frames, each of the plurality of non-anchor hopping frames being located on a different non-anchor channel, each of the plurality of non-anchor hopping frames including a paging frame window; and
monitor for a downlink message in the paging frame window of at least one first non-anchor hopping frame in which a transmission preamble is received from the base station.

23. The apparatus of claim 22, wherein the at least one processor is further configured to:
monitor a predetermined number of subframes in each of the plurality of non-anchor hopping frames for the transmission preamble; and
enter a sleep mode for a remainder of each of the plurality of non-anchor hopping frames in which the transmission preamble is unreceived.

24. The apparatus of claim 22, wherein the at least one processor is further configured to:
receive the paging message during the paging frame window of the at least one first non-anchor hopping frame in which the transmission preamble is received, the paging message being received after the transmission preamble.

25. The apparatus of claim 22, wherein the at least one processor is further configured to at least one of:
receive first data from the base station in each of the plurality of non-anchor hopping frames in which the transmission preamble is received; and
transmit second data to the base station in each of the plurality of non-anchor hopping frames in which the transmission preamble is received.

26. The apparatus of claim 22, wherein:
the paging super frame window includes a plurality of hopping periods;
each of the plurality of hopping periods includes an anchor hopping frame and one of the plurality of non-anchor hopping frames; and
the anchor hopping frame in each of the plurality of hopping periods is located on a same anchor channel.

27. The apparatus of claim 26, wherein the at least one processor is further configured to :
receive at least one discovery reference signal (DRS) in at least one anchor frame in the paging super frame window.

28. The apparatus of claim 26, wherein each of the plurality of hopping periods includes one or more radio frames.

* * * * *